United States Patent
Takahashi et al.

(10) Patent No.: US 8,364,359 B2
(45) Date of Patent: Jan. 29, 2013

(54) CONTROL APPARATUS AND METHOD FOR AUTOMATIC TRANSMISSION

(75) Inventors: Seiichiro Takahashi, Isehara (JP); Tatsuo Ochiai, Kanagawa (JP); Masaaki Uchida, Yokosuka (JP); Masato Koga, Hiratsuka (JP); Ryoji Kadono, Kawasaki (JP); Tateki Jozaki, Yokohama (JP); Hideaki Suzuki, Yokohama (JP); Ryousuke Nonomura, Kawasaki (JP); Mamiko Inoue, Machida (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 509 days.

(21) Appl. No.: 12/712,454

(22) Filed: Feb. 25, 2010

(65) Prior Publication Data

US 2010/0228454 A1 Sep. 9, 2010

(30) Foreign Application Priority Data

Mar. 6, 2009 (JP) .................................. 2009-054057

(51) Int. Cl.
*G06F 7/00* (2006.01)
*G06F 17/00* (2006.01)

(52) U.S. Cl. ................ 701/55; 701/51; 701/62; 701/67; 701/68

(58) Field of Classification Search ........................ None
See application file for complete search history.

(56) References Cited

U.S. PATENT DOCUMENTS

| 4,653,351 A | 3/1987 | Downs et al. |
| 4,672,863 A | 6/1987 | Itoh et al. |
| 6,182,000 B1 * | 1/2001 | Ohta et al. .................... 701/55 |
| 6,377,882 B1 | 4/2002 | Ito |
| 6,855,085 B1 | 2/2005 | Gumpoltsberger |

(Continued)

FOREIGN PATENT DOCUMENTS

| EP | 0 410 451 A2 | 1/1991 |
| EP | 806 592 A2 | 11/1997 |

(Continued)

OTHER PUBLICATIONS

Takahashi et al., USPTO Non-Final Office Action, U.S. Appl. No. 12/712,440, Nov. 3, 2011, 18 pgs.

(Continued)

*Primary Examiner* — Khoi Tran
*Assistant Examiner* — Bao Long T Nguyen
(74) *Attorney, Agent, or Firm* — Foley & Lardner LLP

(57) ABSTRACT

In control apparatus and method for an automatic transmission, a gear shift state of a stepwise variable transmission mechanism is controlled to a target gear shift state by releasing a first engagement section according to a reduction in a capacity of the first engagement section and, simultaneously, by engaging a second engagement section according to an increase in the capacity of the second engagement section, in accordance with a torque inputted to the stepwise variable transmission mechanism and, during an inertia phase, either one of the first and second engagement sections functions as a gear shift state control side engagement section and the capacity of a gear shift state non-control side engagement section which is the other engagement section is increased when determining that it is impossible to make the gear shift state follow up the target gear shift state at the gear shift state control side engagement section.

14 Claims, 16 Drawing Sheets

U.S. PATENT DOCUMENTS

| | | | |
|---|---|---|---|
| 7,384,375 B2 | 6/2008 | Yamada et al. | |
| 7,563,196 B2 * | 7/2009 | Yamada et al. | 477/110 |
| 7,563,197 B2 | 7/2009 | Ayabe et al. | |
| 7,771,316 B2 | 8/2010 | Honma et al. | |
| 7,822,524 B2 * | 10/2010 | Tabata et al. | 701/53 |
| 2001/0044683 A1 | 11/2001 | Takaoka et al. | |
| 2002/0035013 A1 | 3/2002 | Saito | |
| 2005/0272555 A1 | 12/2005 | Tabata et al. | |
| 2006/0154780 A1 | 7/2006 | Ayabe et al. | |
| 2007/0093358 A1 | 4/2007 | Ayabe et al. | |
| 2010/0228454 A1 * | 9/2010 | Takahashi et al. | 701/55 |

FOREIGN PATENT DOCUMENTS

| | | |
|---|---|---|
| EP | 0 959 270 A2 | 11/1999 |
| JP | 61-105361 A | 5/1986 |
| JP | 5-079554 A | 3/1993 |
| JP | 5-240335 A | 9/1993 |
| JP | 6-129528 A | 5/1994 |
| JP | 8-285064 A | 11/1996 |
| JP | 8-291858 A | 11/1996 |
| JP | 10-331962 A | 12/1998 |
| JP | 10-331963 A | 12/1998 |
| JP | 11-37267 A | 2/1999 |
| JP | 11-141675 A | 5/1999 |
| JP | 11-182663 A | 7/1999 |
| JP | 2000-205398 A | 7/2000 |
| JP | 2003-42284 A | 2/2003 |
| JP | 2003-314681 A | 11/2003 |
| JP | 2004-316811 A | 11/2004 |
| JP | 2006-348985 A | 12/2006 |
| JP | 2007-92665 A | 4/2007 |
| JP | 2007-225048 A | 9/2007 |
| JP | 2007-263206 A | 10/2007 |

OTHER PUBLICATIONS

U.S. Appl. No. 12/712,429, filed Feb. 25, 2010, Takahashi et al.
U.S. Appl. No. 12/712,437, filed Feb. 25, 2010, Takahashi et al.
U.S. Appl. No. 12/712,440, filed Feb. 25, 2010, Takahashi et al.
U.S. Appl. No. 12/712,448, filed Feb. 25, 2010, Takahashi et al.
S. Takahashi et al., US PTO Notice of Allowance, U.S. Appl. No. 12/712,440, dated May 9, 2012, (8 pgs.).
S. Takahashi et al., US Non-Final Office Action, U.S. Appl. No. 12/712,448, dated Jul. 24, 2012, (12 pgs.).
S. Takahashi et al., US Non-Final Office Action, U.S. Appl. No. 12/712,437, dated Aug. 16, 2012, (13 pgs.).
Chinese Office Action dated Jul. 4, 2012, (12 pgs.).
S. Takahashi et al., US Final Office Action, U.S. Appl. No. 12/712,448, dated Nov. 14, 2012, (8 pgs.).
S. Takahashi et al., US Notice of Allowance, U.S. Appl. No. 12/712,429, dated Nov. 23, 2012, (48 pgs.) (with 21 US references).
S. Takahashi et al., US Notice of Allowance, U.S. Appl. No. 12/712,437, dated Dec. 7, 2012, (7 pgs.).

* cited by examiner

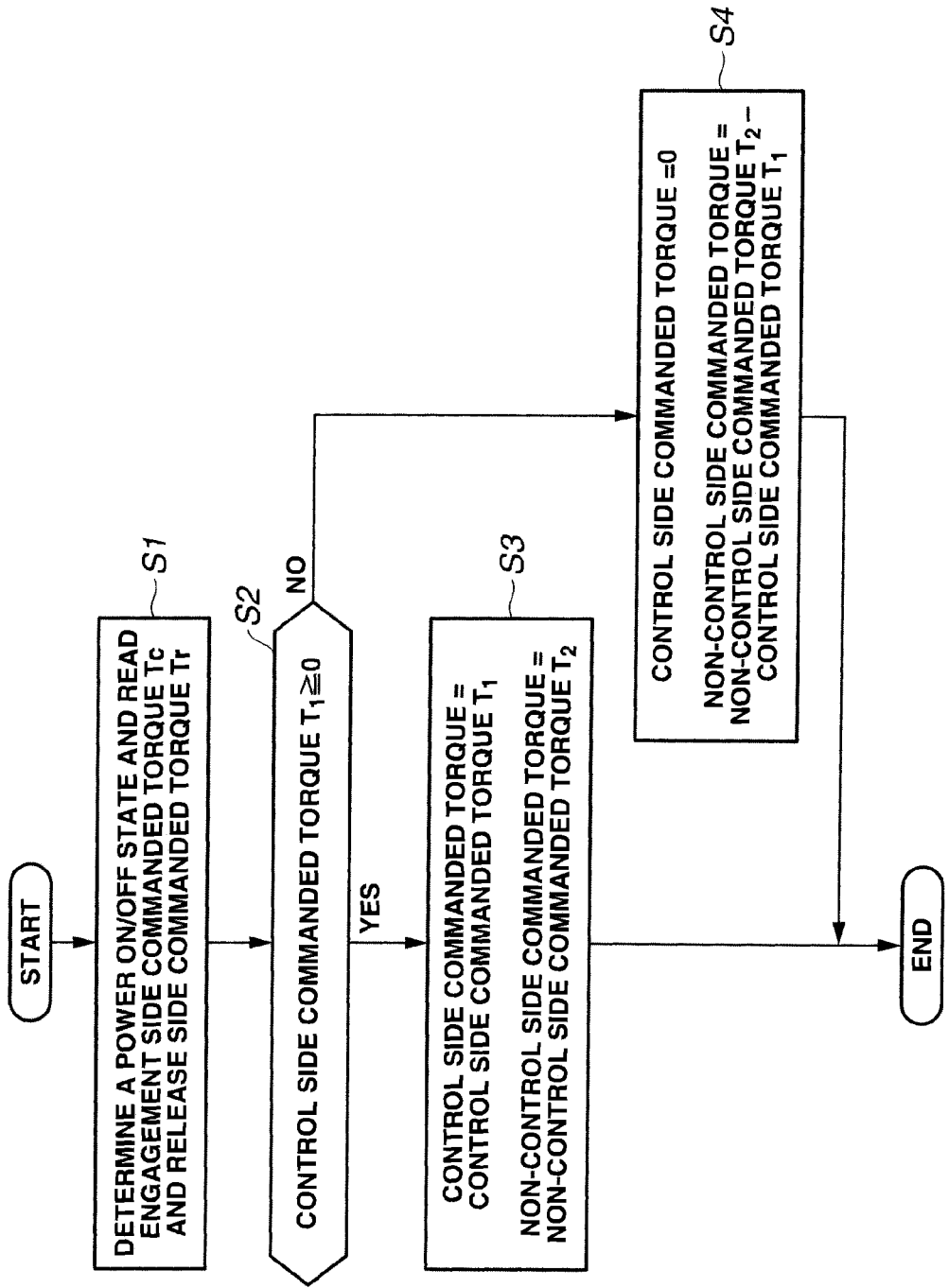

[DURING NO GEAR SHIFT, DURING SHIFT PREPARATION PHASE]

[DURING GEAR SHIFT (TORQUE PHASE, INERTIA PHASE)]

CONTROL APPARATUS AND METHOD FOR AUTOMATIC TRANSMISSION

BACKGROUND OF THE INVENTION (1) Field of the Invention

The present invention relates to control apparatus and method for an automatic transmission which are capable of realizing a target transmission gear (shift) ratio at an intended gear shift speed when a, so-called, replacement gear shift in which a first engagement section is released and, simultaneously, a second engagement section is engaged is performed to achieve the target gear shift ratio.

(2) Description of Related Art

A Japanese Patent Application First Publication No. 2007-263206 published on Oct. 11, 2007 exemplifies a previously proposed control apparatus for the automatic transmission. In the previously proposed control apparatus described in the above-described Japanese Patent Application First Publication, an input torque is determined during an inertia phase of the replacement gear shift, a clutch capacity at a higher speed range (a higher gear shift ratio side) when an input torque is positive and in a power ON state is controlled while a clutch capacity (a, so-called, clutch torque) at a lower gear shift side (a low speed gear ratio) when the input torque is negative and in a power OFF state is controlled so as to make an input revolution speed of the automatic transmission coincident with a target input revolution speed.

SUMMARY OF THE INVENTION

However, in a case where the gear shift is carried out in a region where an absolute value of the input torque is small, the dutch capacity (a, so-called, drag torque) at an input revolution speed control side clutch controlling an input revolution speed (hereinafter, referred to as a control side clutch) is large. At this time, an actual torque of the control side clutch is excessively large with respect to a target torque due to the presence of such a large drag torque (an actual value of the clutch torque). In this case, since the actual torque does not become zero even if the target torque is reduced to zero, to the control side clutch is still provided with a torque corresponding to the drag torque. Therefore, even in the previously proposed control apparatus, an input revolution speed cannot follow up a target input revolution speed and a variation of the input revolution speed becomes is faster than the target input revolution speed so that variations in a gear shift speed often occur.

It is, therefore, an object of the present invention to provide improved control apparatus and method for an automatic transmission which are capable of realizing the target gear shift at the intended shift speed without an unpleasant feeling given to vehicular occupants. That is to say, according to the present invention, when the control of the input revolution speed cannot be made at one of the engagement sections at a control side at which an input revolution speed of a stepwise variable transmission mechanism during an inertia phase in which a gear shift control according to the replacement gear shift between an engagement side engagement section and a release side engagement section is carried out, the capacity of the engagement section at a non-control side is increased.

According to one aspect of the present invention, there is provided a control apparatus for an automatic transmission, comprising: a stepwise variable transmission mechanism including a plurality of engagement sections, each of the engagement sections being engaged according to an increase in a capacity of a corresponding one of the engagement sections while being released according to a reduction in the capacity of corresponding another of the engagement sections and a target gear shift state being determined according to a combination of release and engagement of the respective to engagement sections; and a control section configured to control a gear shift state of the stepwise variable transmission mechanism to become equal to a target gear shift state by releasing a first engagement section of the engagement sections according to a reduction in the capacity of the first engagement section and, simultaneously, by engaging a second engagement section of the engagement sections according to an increase in the capacity of the second engagement section, in accordance with a torque inputted to the stepwise variable transmission mechanism, the control section, during an inertia phase when the stepwise variable transmission mechanism is gear shift controlled, making either one of the first and second engagement sections function to be a gear shift state control side engagement section and being configured to increase the capacity of a gear shift non-control side engagement section which is the other of the first and second engagement sections when determining that it is impossible to make the gear shift state of the stepwise variable transmission mechanism follow up the target gear shift state at the gear shift state control side engagement section.

According to another aspect of the present invention, there is provided a control method for an automatic transmission, the automatic transmission comprising a stepwise variable transmission mechanism including a plurality of engagement sections, each of the engagement sections being engaged according to an increase in a capacity of a corresponding one of the engagement sections while being released according to a reduction in the capacity of corresponding another of the engagement sections and a target gear shift state being determined according to a combination of release and engagement of the respective engagement sections and the control method comprising controlling a gear shift state of the stepwise variable transmission mechanism to become equal to the target gear shift state by releasing a first engagement section of the engagement sections according to a reduction in the capacity of the first engagement section and, simultaneously, by engaging a second engagement section of the engagement sections according to an increase in the capacity of the second engagement section, in accordance with a torque inputted to the stepwise variable transmission mechanism; and, during an inertia phase when the stepwise variable transmission mechanism is gear shift controlled, making either one of the first and second engagement sections function to be a gear shift state control side engagement section and being configured to increase the capacity of a gear shift non-control side engagement section which is the other of the first and second engagement sections when determining that it is impossible to make the gear shift state of the stepwise variable transmission mechanism follow up the target gear shift state at the gear shift state control side engagement section.

BRIEF DESCRIPTION OF THE DRAWINGS

FIG. 5 is a flowchart representing a flow of a torque distribution control in accordance with the present invention and being executed by the control apparatus of the embodiment shown in FIG. 1 during a replacement gear shift control.

DETAILED DESCRIPTION OF THE INVENTION

Figure 1:
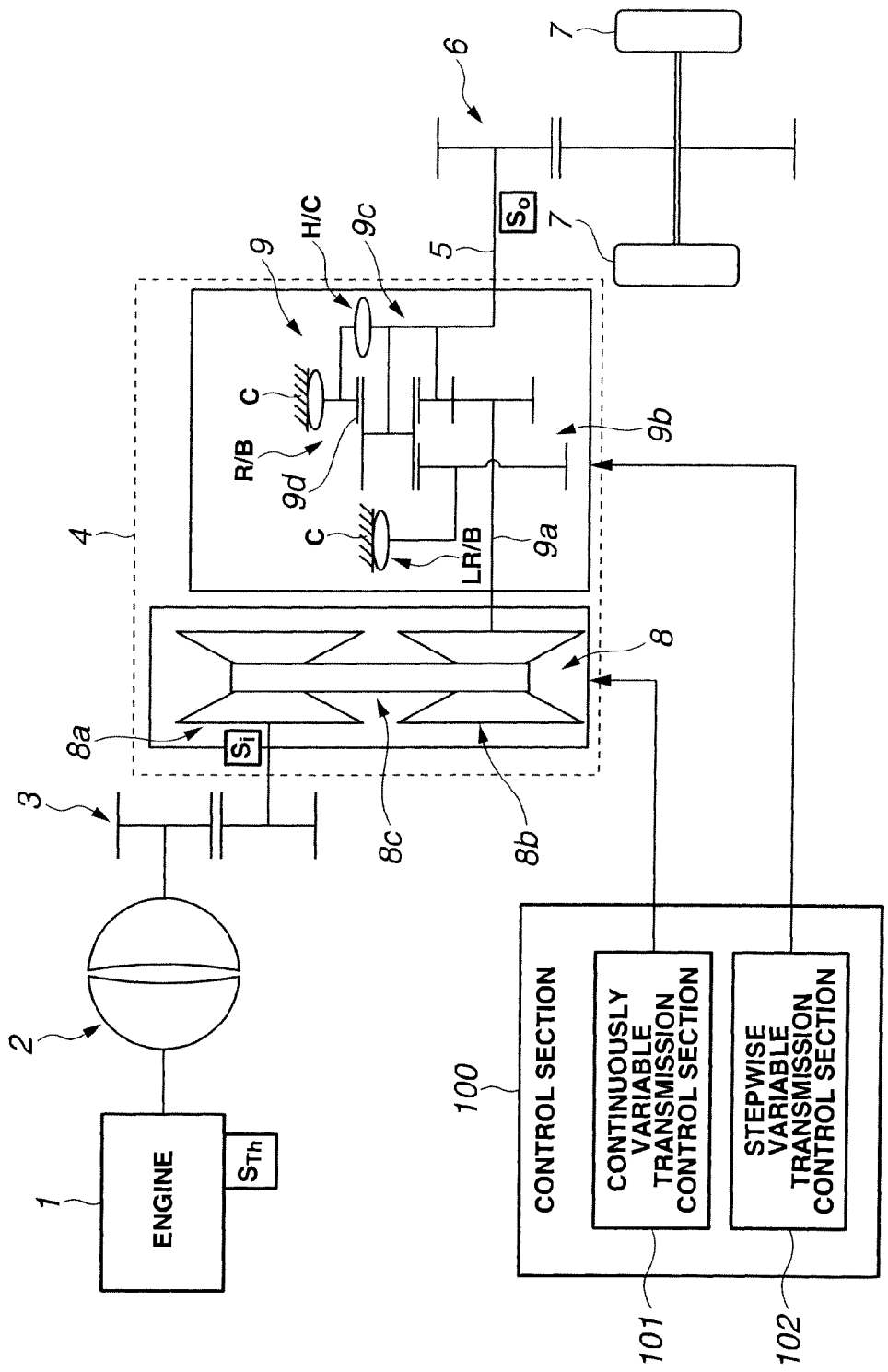
FIG. 1 is a system configuration view representing diagrammatically a power train of a vehicle in which a control apparatus for an automatic transmission in a preferred embodiment according to the present invention is mounted.

Reference will hereinafter be made to the drawings in order to facilitate a better understanding of the present invention, namely, control apparatus and method for an automatic transmission according to the present invention. A power train shown in FIG. 1 includes: an engine 1 which is a drive source; a torque converter 2 which is drivingly coupled with engine 1; an automatic transmission 4 which is drivingly coupled with torque converter 2 via a speed-reducing mechanism 3; a final drive gear mechanism 6 which is drivingly coupled via a transmission output shaft (propeller shaft) 5; and road wheels 7, 7 to which a power from automatic transmission 4 is outputted via final drive gear mechanism 6.

Automatic transmission 4 is constituted by a continuously variable transmission mechanism 8 and an auxiliary (or sub) transmission mechanism 9.

Continuously variable transmission mechanism 8 includes a drive pulley 8a linked with an output shaft of differential (speed reducing) mechanism 3 and a driven pulley 8b linked with an input shaft 9a of auxiliary transmission mechanism 9 and is a well known belt-type continuously variable transmission over drive and driven pulleys 8a and 8b over which a belt 8c is spanned. Oil is supplied to drive pulley 8a and driven pulleys, respectively. A pulley width is freely modified according to a hydraulic pressure of oil supplied to drive and driven pulleys 8a and 8b. Thus, pressure supplies of the hydraulic pressure are controlled between drive pulley 8a and driven pulley 8b to enable a gear shift ratio to be modified at an unlimited stage.

Auxiliary transmission mechanism 9 is a stepwise variable transmission mechanism in which driven pulley 8b is drivingly coupled with a composite sun gear 9b of a ravigneaux planetary gear mechanism to be inputted as a corresponding sun gear 9b and a carrier 9c is drivingly coupled with transmission output shaft 5 to be outputted as carrier 9c. It should be noted that sun gear 9b is fixed via a low-and-reverse brake LR/B (brake and connected to a casing (a first speed (1-st speed) selecting brake) and a carrier 9c is drivingly coupled to ring gear 9d via a high clutch (a second speed (2-nd speed) selecting clutch) H/C. Furthermore, a ring gear 9d is fixed to casing C via a reverse brake R/B.

Oil can be supplied to low-and-reverse brake (hereinafter, called a low brake) LR/B, high clutch H/C, and reverse brake R/B so as to enable engagement and release thereof freely in accordance with a hydraulic pressure. Thus, auxiliary transmission mechanism 9 enables the supplied hydraulic pressure control for low brake LR/B, high dutch H/C, and reverse brake R/B to enable a selection of a forward 1-st speed, a forward 2-nd speed, and a reverse (R).

In a case where forward 1-st speed selection is carried out, low brake (LR/B) is engaged and high clutch H/C is, simultaneously, released. In addition, in a case where the forward 2-nd speed is selected, low brake LR/B is released and high clutch H/C is engaged. It should be noted that details of the relationship between an engagement (O) and a release (X) in the control of auxiliary transmission mechanism 9 will be described in the following table 1.

TABLE 1

|           | LR/B | H/C | R/B |
|-----------|------|-----|-----|
| 1st speed | O    | X   | X   |
| 2nd speed | X    | O   | X   |
| Reverse   | O    | X   | O   |

In addition, a vehicle related to this embodiment is provided with a gear shift control section 100 to perform a gear shift control for automatic transmission 4, as shown in FIG. 1. (Gear shift) control section 100 includes a continuously variable transmission control section 101 which controls a transmission gear ratio (or a gear shift ratio) $R_{a(CVT)}$ of continuously variable transmission mechanism 8 at an unlimited stage on a basis of a target input revolution speed $N_{i(O)}$ with a calculation of target input revolution speed $N_{i(O)}$ of automatic transmission 4 and a stepwise variable transmission control section 102 which calculates a target gear shift stage and controls the actual gear shift stage to reach to the target gear shift state.

That is to say, target gear shift ratio $I_O$ can be achieved by a coordination (or a cooperative shift) of the gear shift control between the gear shift controls of continuously variable transmission mechanism 8 and auxiliary transmission mechanism 9 as a whole automatic transmission 4.

Figure 2:
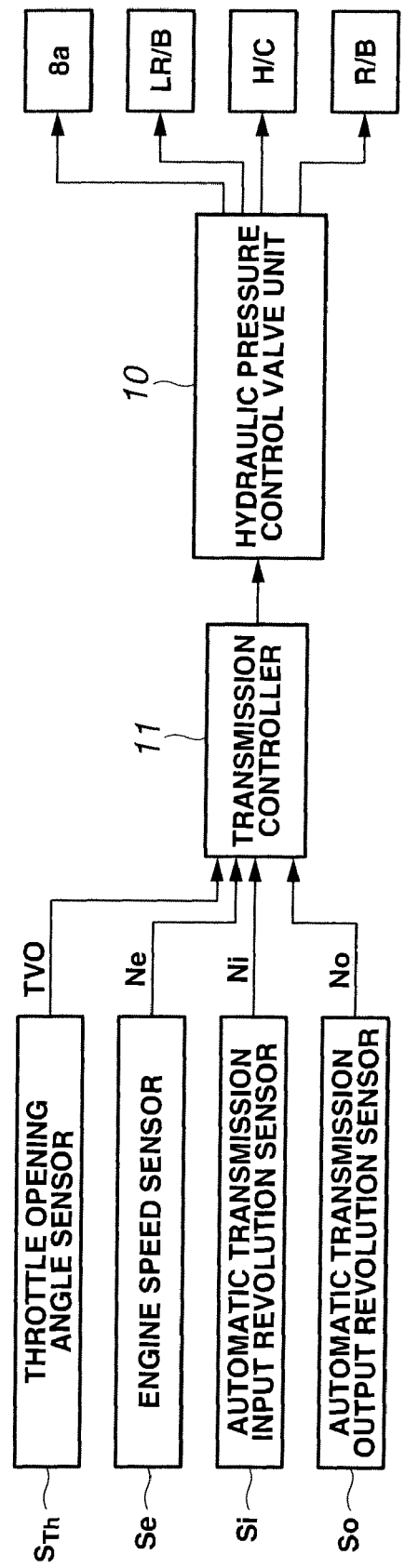
FIG. 2 is a system configuration block diagram representing a control system of the power train shown in FIG. 1.

In continuously variable transmission mechanism 8, as shown in FIG. 2, a plurality of solenoid valves incorporated into a hydraulic pressure control valve unit 10 are ON or OFF (ON/OFF) controlled with supply pressures (ordinarily, only the supply (hydraulic) pressure to drive pulley 8a is controlled) controlled. Thus, the transmission gear ratio (gear shift ratio) can be modified at the unlimited stage. In auxiliary transmission mechanism 9, in the same manner as the continuously variable transmission mechanism 8, the ON or OFF control of the plurality of solenoid valves incorporated into hydraulic pressure control valve unit 10 so as to control the supply pressures to low brake LR/B, high clutch H/C, and reverse brake R/B to select the forward 1-st speed, the forward 2-nd speed, and the reverse (R).

Hydraulic pressure control valve unit 10, as shown in FIG. 2, is controlled by means of a transmission controller 11. In transmission controller 11, signals from a throttle opening angle sensor $S_{Th}$ which detects an opening angle TVO of an engine throttle valve, from engine speed sensor Se which detects an output revolution speed of engine 1 (hereinafter, referred to as an engine speed) Ne, an input revolution speed Ni of automatic transmission 4 (hereinafter, referred to as an automatic transmission input revolution speed Si, and of a revolution speed $N_O$ of an output shaft 5 of automatic transmission 4 from output revolution sensor $S_O$ of automatic transmission 4.

Figure 3:
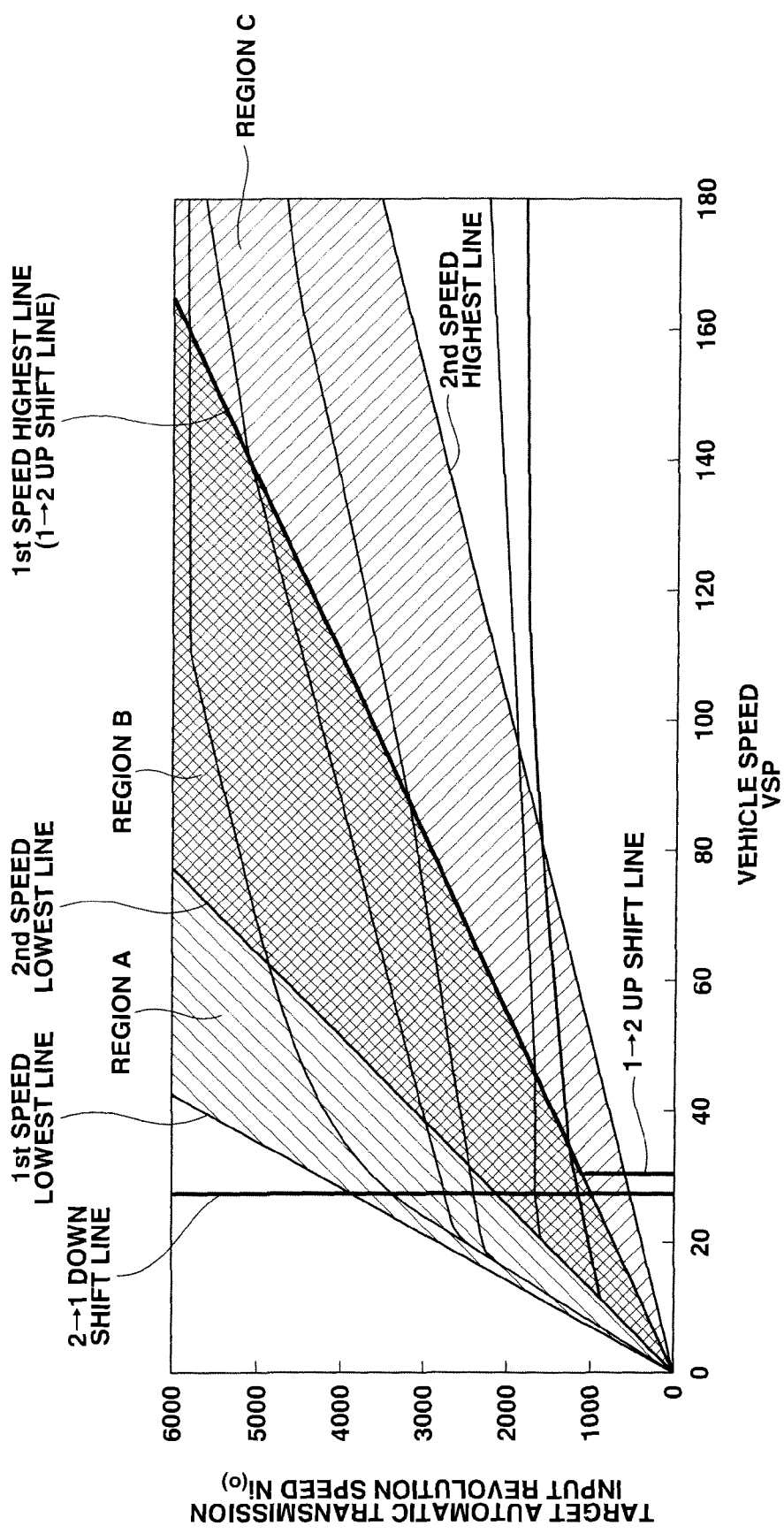
FIG. 3 is a shift schedule diagram exemplifying gear shift lines used when a control in the control apparatus shown in FIG. 1 is carried out.

Transmission controller 11 of automatic transmission 4 performs the gear shift control for automatic transmission 4 using a (gear) shift line diagram of FIG. 3 on a basis of these input pieces of sensor information. The (gear) shift line diagram shown in FIG. 3 is a combination between the gear shift lines of continuously variable transmission mechanism 8 and auxiliary transmission mechanism 9. In a case where the forward 1-st speed is selected as the gear shift stage of auxiliary transmission mechanism 9, a gear shift enabling region is a region from 1-st speed lowest line up to a 1-st speed highest line Hi. On the contrary, in a case where forward 2-nd speed is selected as the gear shift stage of auxiliary transmission mechanism 9, the gear shift enabling region of continuously variable transmission mechanism 9 is a region ranging from a 2-nd speed lowest line to a 2-nd speed highest line.

Therefore, a region A shown in FIG. 3 is a region in which the gear shift control is possible only when the gear shift stage of auxiliary transmission mechanism 9 is the forward 1-st speed. In addition, a region B in FIG. 3 is a region in which the shift control is possible in which forward 1-st speed and forward 2-nd speed are selected as the gear shift stage of auxiliary transmission mechanism 9. It should be noted that a region C in FIG. 3 is a region in which the gear shift control is possible only when the gear shift stage of auxiliary transmission mechanism 9 is in the forward 2-nd speed.

In regions A~C, continuously variable transmission mechanism 8 is controlled to achieve target automatic transmission input revolution speed $N_{i(O)}$ by deriving target automatic transmission input revolution speed $N_{i(O)}$ in accordance with a vehicle speed VSP (corresponds to the resolution speed of the output shaft of auxiliary transmission mechanism 9) and throttle opening angle TVO, in the same way as the previously proposed control apparatus for the automatic transmission described in the BACKGROUND OF THE INVENTION on a basis of FIG. 3. Thus, in continuously variable transmission mechanism 8, a continuous control is achieved at an unlimited stage of the gear shift ratio. That is to say, hydraulic pressure control valve unit 10 and transmission controller 11 correspond to continuously variable transmission control section 101, in this embodiment.

Whereas, the shift line of auxiliary gear shift mechanism 9 determines the forward 1-st speed and the is forward 2-nd speed according to 1→2 UP SHIFT line to switch the gear shift from the forward 1-st speed to the forward 2-nd speed and 2→1 DOWN SHIFT line to switch the gear shift from the forward 2-nd speed to the forward 1-st speed.

For example, if the traveling state determined according to vehicle speed VSP and throttle opening angle TVO is such a traveling state as crossing 1→2 UP SHIFT line from a lower-vehicle speed side to a higher-vehicle speed side, in auxiliary transmission mechanism 9, low brake LR/B is released and high clutch H/C is engaged to select the forward 2-nd speed.

Whereas, in such a traveling state as determined according to vehicle speed VSP and throttle opening angle TVO is a traveling state such as to cross over 2→1 DOWN SHIFT line from the higher speed side to the lower speed side, in auxiliary transmission mechanism 9, high clutch H/C is released and low brake LR/B is engaged. That is to say, in this embodiment, hydraulic pressure control valve unit 10 and transmission controller 11 correspond to a stepwise variable transmission control section 102.

Hence, if the shift schedule diagram of FIG. 3 is used, vehicle speed VSP and throttle opening angle TVO are calculated so that the forward 1-st speed or the forward 2-nd speed is selected in auxiliary transmission mechanism 9 and, at the same time, in continuously variable transmission mechanism 8, the gear shift control is carried out at the unlimited stage in accordance with vehicle speed VSP and throttle opening angle TVO.

In addition, in automatic transmission 4, a replacement gear shift is carried out at auxiliary transmission mechanism 9 and, at the same time, the continuously variable (continuous shift control) shift control at continuously variable transmission 8 is carried out so that the shift control of continuously variable transmission 8 is coordinately (cooperatively) carried out together with the shift control in stepwise variable transmission mechanism 8 (a coordinate (cooperative) shift control).

Figure 4:
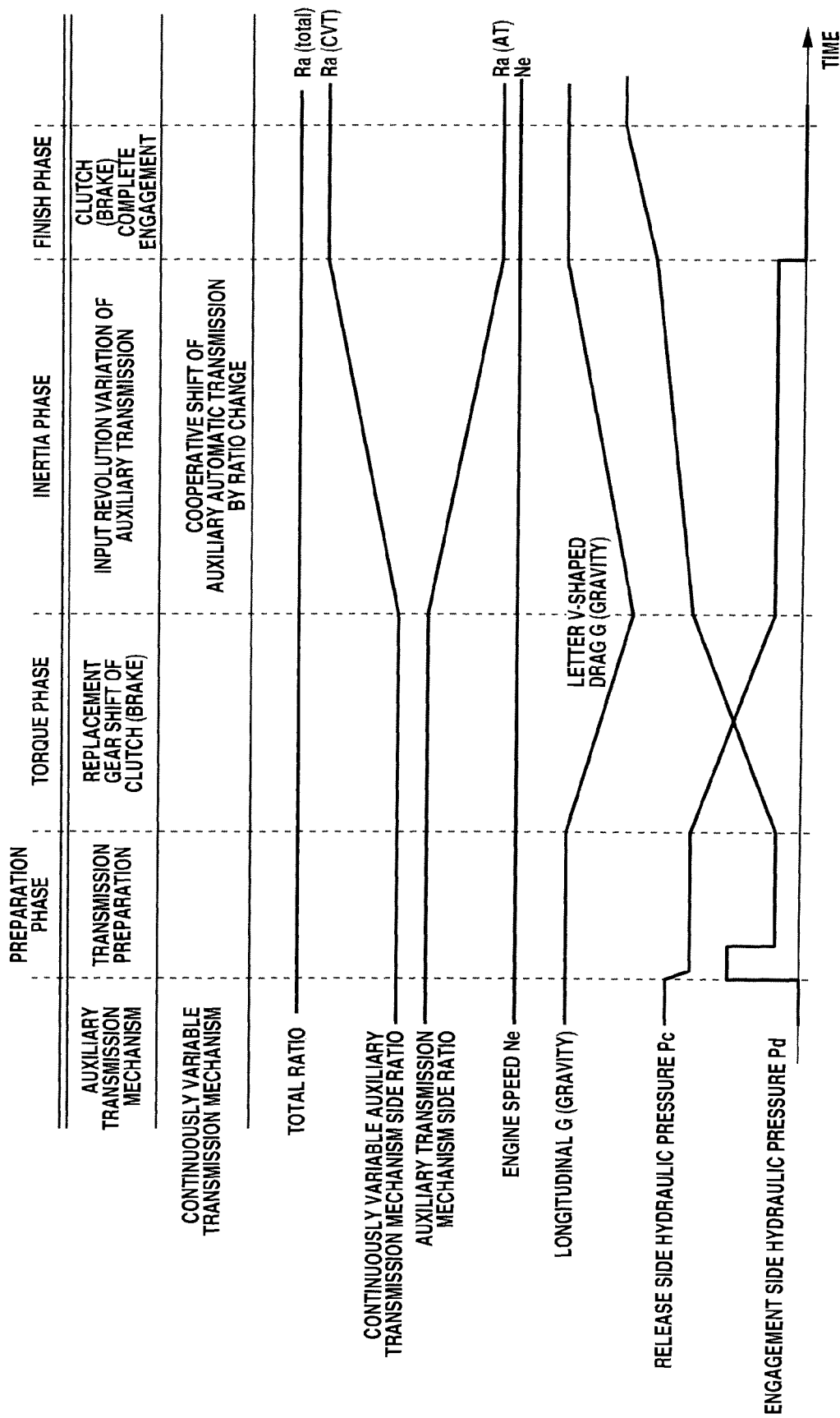
FIG. 4 is a timing chart representing a basic control flow of a stepwise variable transmission mechanism related to the embodiment shown in FIG. 1 in a time series manner.

Such a gear shift control as described above is called a cooperative shift control and, as shown in FIG. 4, a variation in the gear shift ratio of auxiliary gear shift mechanism $R_{a(AT)}$ of auxiliary transmission mechanism 9 to be generated by carrying out the replacement gear shift in auxiliary transmission mechanism 9 is compensated for variation $R_{a(CVT)}$ in the transmission gear ratio (gear shift ratio) of continuously variable transmission mechanism 9. Consequently, such a smooth gear shift as no variation generated in a shift ratio (hereinafter called a total ratio) as a whole automatic transmission 4 can be achieved.

As a specific example, at the same time as the up-shift of the gear shift stage of auxiliary transmission mechanism 9 from the forward 1-st speed stage to the forward 2-nd stage, a shift down (down shift) of continuously variable transmission mechanism 8 is performed. Thus, the gear shift with input revolution speed $N_i$ of automatic transmission 4 generated by means of both of transmission mechanisms 8, 9 maintained constant can be achieved. That is to say, if the coordinate (cooperative) shift control is performed for automatic transmission 4, an inertia torque and a shift shock are suppressed which are generated when the up shift of auxiliary transmission mechanism 9 is carried out. A smooth gear shift can be achieved as if the gear shift were carried out in continuously variable is transmission mechanism 8.

As described hereinabove, automatic transmission 4 realizes a wide ratio coverage by means of continuously variable transmission mechanism 8 in which the transmission gear ratio (ratio) can be modified at the unlimited stage and auxiliary transmission mechanism 9 in which an arbitrary shift stage from a plurality of shift stages can be selected.

That is to say, as described hereinabove, automatic transmission 4 is, for example, a combination of continuously variable transmission mechanism 8 and auxiliary (stepwise variable) transmission mechanism 9 with hydraulic pressure control valve unit 10 and transmission controller 11 as control means. As compared with the ratio coverage which can be obtained from either one of the transmission mechanisms, an expanded ratio coverage can be obtained.

On the other hand, as in auxiliary transmission mechanism 9 in which, while a first engagement section is released, a second engagement section is engaged as in a so-called, replacement gear shift, during a gear shift process, an, so-called, inertia phase is present in a state transition from a revolution speed before the replacement gear shift to the revolution speed after the replacement gear shift. During the inertia phase, a predetermined one of the engagement sections (hereafter, called a control side engagement section) at an input revolution control side which controls input revolution speed $N_{i(AT)}$ to become equal to its target value is different according to a magnitude (approximately positive or negative) of input torque $T_{i(AT)}$ of auxiliary transmission mechanism 9 (automatic transmission 4).

For example, in a case where the gear shift occurs in a power ON state in which input torque $T_{i(AT)}$ of auxiliary transmission mechanism 9 is a positive torque (a torque such that an input side of auxiliary transmission mechanism 9 provides a drive side), a high speed stage side (Hi) engagement section in which the gear shift ratio is small controls input revolution speed $N_{i(AT)}$ during the inertia phase, irrespective of the up shift and the down shift. That is to say, during the inertia phase of the power ON gear shift state, high-clutch H/C provides a control side engagement section which controls input revolution speed $N_{i(AT)}$ as described above.

On the other hand, in a state where the input torque of auxiliary shift mechanism 9 provides a negative torque (a torque such that an output side of auxiliary transmission mechanism 9 is the drive side), namely, in a case of the gear shift in a power OFF state, during the inertia phase, regardless of the up-shift and down-shift, a lower speed side (Low) side engagement section having a large gear shift ratio controls input revolution speed $N_{i(AT)}$. That is to say, in an inertia phase of the power OFF gear shift, low brake LR/B provides the control side engagement section which controls input revolution speed $N_{i(AT)}$.

With reference to the flowchart in FIG. 5, a torque distribution control in accordance with the present invention in the replacement gear shift will, hereinafter, be explained. It should be noted that the gear shift control described hereinbelow is executed by a duty (D) control of solenoid valves of hydraulic pressure control valve unit 10. It should be noted that either one of hydraulic pressure and torque is included in the capacity of each of the engagement sections related to the present invention.

At a step S1, control section 100 (transmission controller 11) reads the power ON or power OFF state, a commanded torque (hereinafter, called an engagement side commanded torque) Tc commanded to an engagement side engagement section whose state is transferred from the released state to the engagement state, and another commanded torque (hereinafter, release side commanded torque) Tr commanded to the release side engagement section whose state is transferred from the engagement state to the release state.

In addition, at step S1, transmission controller 11, in accordance with the read power ON or OFF state, either one of release side engagement section (first engagement section) or engagement side engagement section (second engagement section) functions as a control side engagement section which controls either one of input revolution speed $N_{i(AT)}$ of release side engagement section and engagement side engagement section to become equal to target input revolution speed $N_{i(AT)(0)}$ so that the other one of first or second engagement section is set as a non-control side engagement section.

At a step S2, transmission controller 11 determines whether input revolution speed $N_{i(AT)}$ can follow up target input revolution speed $N_{i(AT)(0)}$. In this embodiment, transmission controller 11 determines whether the target value of the capacity of control-side engagement section has reached to a predetermined value. As a specific example, transmission controller 11 determines whether control-side commanded torque T1 is equal to or larger than zero with control side commanded torque T1 of control side engagement section as the capacity.

At a step S2, if control-side commanded torque $T_1$ is equal to or larger than zero, there is a room that control side engagement section can still control commanded torque $T_1$. Thus, control side commanded torque $T_1$ calculated at step S1 is directly set as control side commanded torque and commanded torque $T_2$ (non-control side commanded torque) at the non-control side engagement section is directly set as a non-control side commanded torque.

On the other hand, at step S2, when control side commanded torque $T_1$ is determined to be below zero, at a step S4, the control side engagement section is controlled according to commanded torque $T_1$ and control side commanded torque $T_1$ ($T_1<0$) is subtracted from non-control side commanded torque $T_2$ and a value of $T_2(C)$ ($=T_2+|T_1|$) to which an absolute value of control side commanded torque $T_1$ is added is set as the non-control side commanded torque.

Hence, the replacement gear shift control is executed on a basis of control side commanded torque and non-control side commanded torque. It should be noted that, in this embodiment, as described hereinbelow, the control side commanded torque and the non-control side commanded torque are converted as the hydraulic pressure and, with this hydraulic pressure as commanded hydraulic pressure, the replacement gear shift control of auxiliary transmission mechanism 9 is executed.

Hereinafter, with reference to FIGS. 6 through 13B, a control flow in FIG. 4 will be described in details in a sequence of a power OFF up shift operation, a power ON down shift operation, a power ON up shift operation, and a power OFF down shift operation. It should be noted the power ON state means that throttle opening angle TVO is opened to a predetermined value or larger and the power OFF state means that throttle opening angle TVO is in a close direction.

Figure 6A:
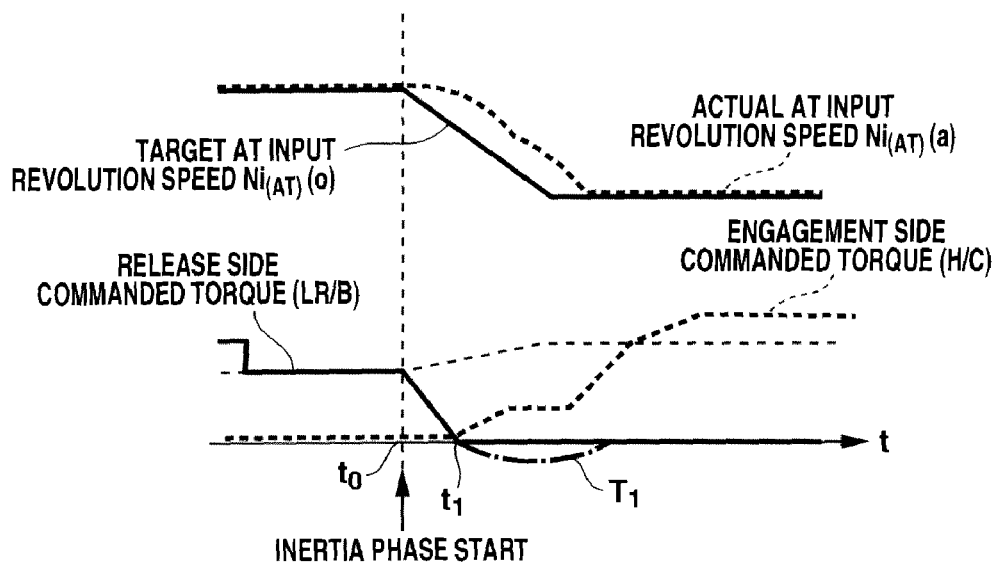
FIGS. 6A and 6B are a timing chart representing an operation of an auxiliary transmission mechanism when a commanded torque control according to the present invention is executed during a power OFF up shift operation in a time series manner and a timing chart representing the operation of the automatic transmission when the same control is executed as the automatic transmission in the time series manner, respectively.
Figure 6B:
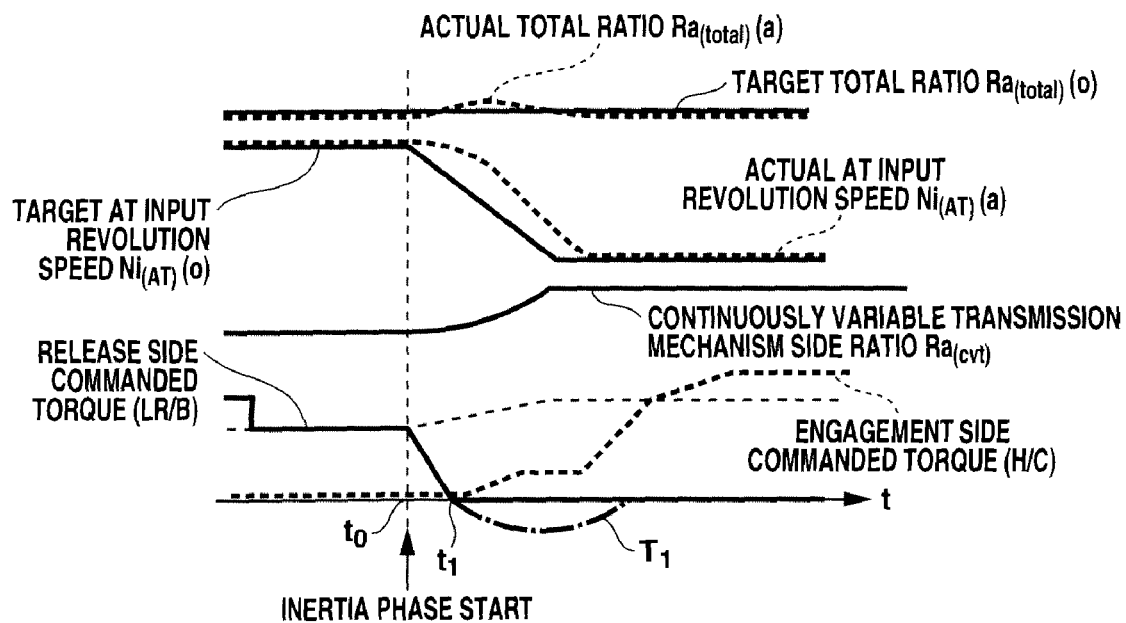

At first, FIGS. 6A and 6B show timing charts representing an operation of auxiliary transmission mechanism 9 in a time series manner and representing the operation of automatic transmission in the time series manner when a commanded torque control according to the present invention is executed during the power OFF up shift, respectively.

Figure 7A:
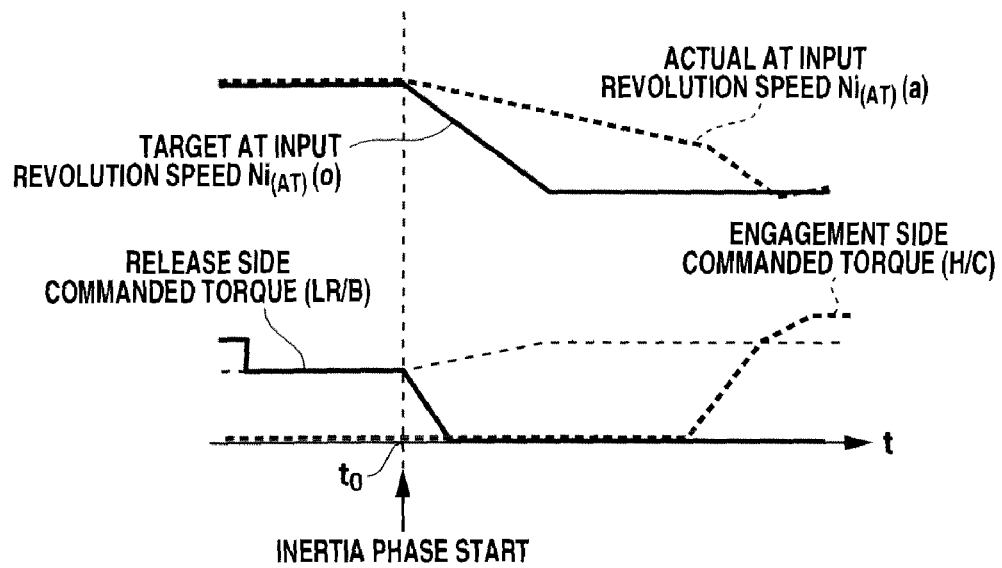
FIGS. 7A and 7B are a timing chart representing the operation of the auxiliary transmission mechanism when the commanded torque control in a comparative example to the preferred embodiment is carried out at a time of the power OFF up shift operation in the time series manner and a timing chart representing the operation of the automatic transmission in the time series manner during the power OFF up shift operation when the same control is executed as the automatic transmission, respectively.
Figure 7B:
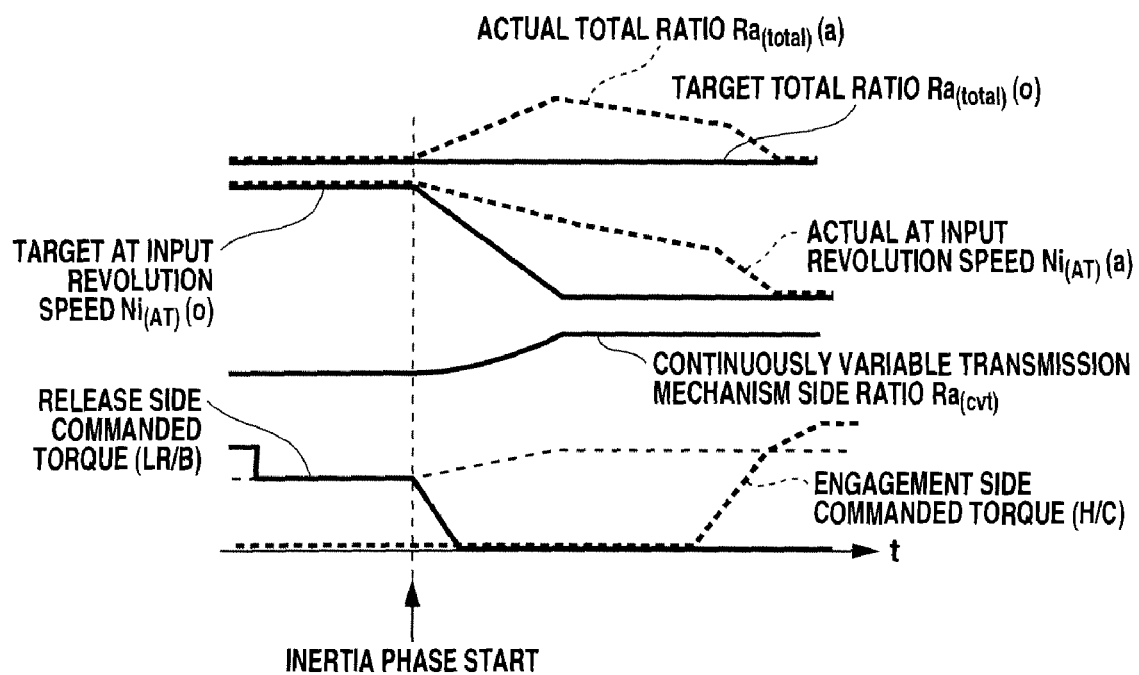

In addition, FIGS. 7A and 7B shows a timing chart representing the operation of the auxiliary transmission mechanism when the commanded torque control in a comparative example to the preferred embodiment is carried out at a time of the power OFF up shift operation in the time series manner and a timing chart representing the operation of the automatic transmission in the time series manner during the power OFF up shift operation when the same control is executed as the automatic transmission, respectively.

During the inertia phase of the power OFF up shift, the power is in the OFF state. Therefore, input revolution speed $N_{i(AT)}$ of auxiliary transmission mechanism 9 is controlled at one of the engagement sections at the low-speed stage side, namely, by a release side low brake LR/B (first engagement section).

Hence, in this embodiment, as shown in FIG. 6A, the control side command torque is directly controlled to be control side commanded torque $T_1$ and the non-control side commanded torque is directly controlled to be the non-control side commanded torque $T_2$ (=0) from a time (t=$t_0$) at which the inertia phase is started to a time at which the commanded torque for the release side low brake LR/B becomes zero (step S3 in FIG. 5).

However, in a case where an absolute value of input torque $T_{i(AT)}$ is small, variations of actual input revolution speed (actual input revolution speed) $N_{i(AT)}(a)$ for the engagement section due to such as a, so-called, drag torque with respect to target input revolution speed $N_{i(AT)\,(o)}$ do not often advance when input torque $Ti_{(AT)}$ is minute or when the variations in the engagement sections such as the clutches or the brakes are provided, even if the commanded torque of release side low brake LR/B is made zero.

Whereas, in this embodiment, when control side commanded torque of release side low brake LR/B is below zero of control side commanded torque of low brake LR/B at the release side (t=t1: step S4), absolute value $|T_1|$ of control side commanded torque $T_1$ (a dotted line of FIGS. 6A and 6B) is added to the non-control side commanded torque $T_2$ of high clutch H/C (second engagement side) at the engagement side which is non-control side to serve as a non-control side commanded torque (step S4 in FIG. 5).

Thus, in this embodiment, even if the revolution variation of input revolution speed $N_{i(AT)}$ is controlled in a reduction direction by means of the release side low brake LR/B but the revolution variation of actual input revolution speed $N_{i(AT)}(a)$ is not reduced, the revolution variation of actual input revolution speed $N_{i(AT)}(a)$ is reduced by the increase of the commanded torque of engagement-side high clutch H/C. Hence, auxiliary transmission mechanism 9 itself can make actual input revolution speed $N_{i(AT)}(a)$ as denoted by a dot line follow up target input revolution speed $N_{i(AT)}(O)$ denoted by a solid line without generation of a large delay with respect to target input revolution speed $N_{i(AT)}(0)$ denoted by the solid line, as shown in FIG. 6A.

In addition, as viewed from automatic transmission 4, actual total ratio (hereinafter, actual total ratio) $Ra_{(total)}(a)$) can follow up, without generation of the large delay, a target total ratio (as denoted by a solid line) $Ra_{(total)}(0)$, as shown in FIG. 6B. That is to say, in this embodiment, a disturbance in the cooperative control for the gear shift with continuously variable transmission mechanism 8 can be suppressed.

It should be noted that, as in the case of the present invention, in a case where input revolution speed $N_{i(AT)}$ reaches to target input revolution speed $N_{i(AT)}(0)$ by adding the absolute value of control side commanded torque $T_1$ to non-control side commanded torque $T_2$ (in this embodiment, $T_2$=0) and the inertia phase is ended, engagement side commanded torque is raised to the engagement torque capacity with a predetermined margin to finish the gear shift while an end phase is made earlier.

On the contrary, in the comparative example, since only commanded torque $T_1$ at release side low brake LR/B (first engagement section) is controlled, the variation in actual input revolution speed $N_{i(AT)}(a)$ is not advanced with respect to target input revolution speed $N_{i(AT)}(o)$. At this time, it is impossible to control actual input revolution speed $N_{i(AT)}(a)$ by low brake LR/B is in a direction in which the revolution speed variation is made faster.

Hence, in auxiliary transmission mechanism 9 itself, the large delay occurs in actual input revolution speed $N_{i(AT)}(a)$ as denoted by the dot line with respect to target input revolution speed $N_{i(AT)}(O)$ denoted by the solid line, as shown in FIG. 7A. In addition, as viewed from automatic transmission 4, the large delay occurs in auxiliary transmission mechanism 9 itself. A large variation occurs in actual total ratio $Ra_{(total)}(a)$ denoted by the dot line with respect to target total ratio $Ra_{(total)}(O)$ denoted by the solid line, as shown in FIG. 7B. Thus, in the comparative example, the disturbance in the cooperative control with the gear shift in continuously variable transmission mechanism 8 often occurs.

It should be noted that, in the power OFF up shift, a predetermined torque capacity may be considered to be provided in the engagement side engagement section in order to eliminate the delay in the gear shift speed. However, in this case, auxiliary transmission mechanism 9 is in an interlock state. Hence, a problem of the generation of the shift shock is unavoidable.

On the contrary, in this embodiment, the non-control side commanded torque is increased to a value larger than zero when the control-side commanded torque becomes below zero. Hence, while the intended gear shift speed is achieved, the shift shock can be suppressed.

Figure 8A:
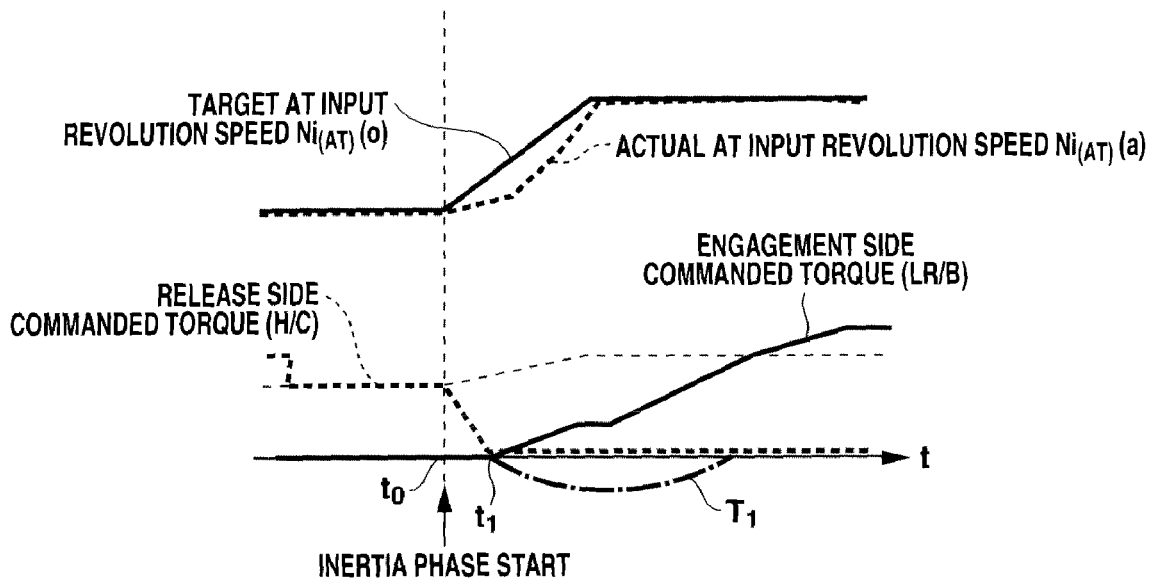
FIGS. 8A and 8B are a timing chart representing the operation of the auxiliary transmission mechanism when the commanded torque control in the preferred embodiment is carried out at a time of a power ON down shift operation and a timing chart representing the operation of the automatic transmission in the time series manner when the same control is executed as the automatic transmission at a time of the power ON up shift operation, respectively.
Figure 8B:
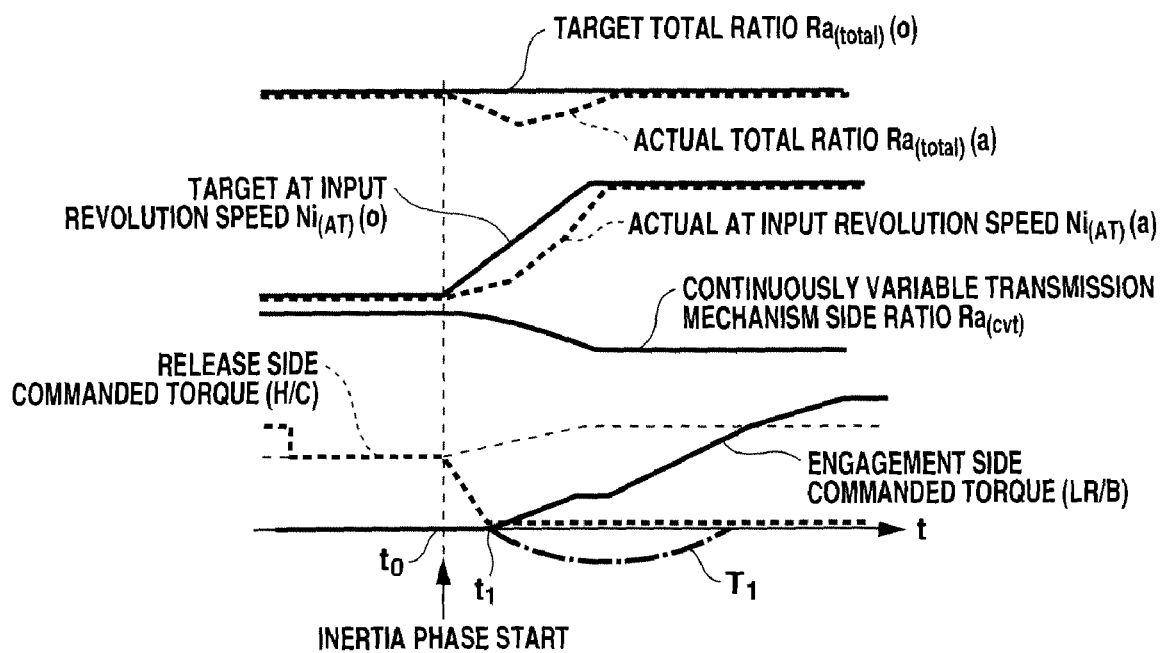

Next, FIGS. 8A and 8B are a timing chart Representing the operation of the auxiliary transmission mechanism when the commanded torque control in the preferred embodiment is carried out at a time of a power ON down shift operation and a timing chart representing the operation of the automatic transmission in the time series manner when the same control is executed as the automatic transmission at a time of the power ON up shift operation, respectively.

Figure 9A:
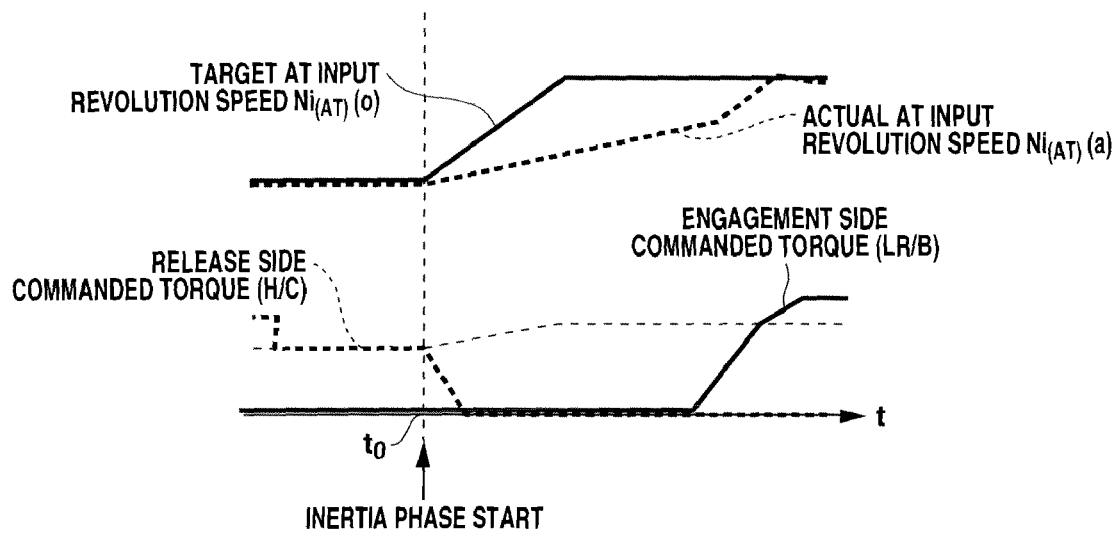
FIGS. 9A and 9B are a timing chart representing the operation of the auxiliary transmission mechanism in the time series manner when the commanded torque control in the comparative example is carried out during a power ON down shift operation and a timing chart representing the operation of the auxiliary transmission mechanism in the time series manner when the same control is executed as the automatic transmission during the power ON down shift operation, respectively.
Figure 9B:
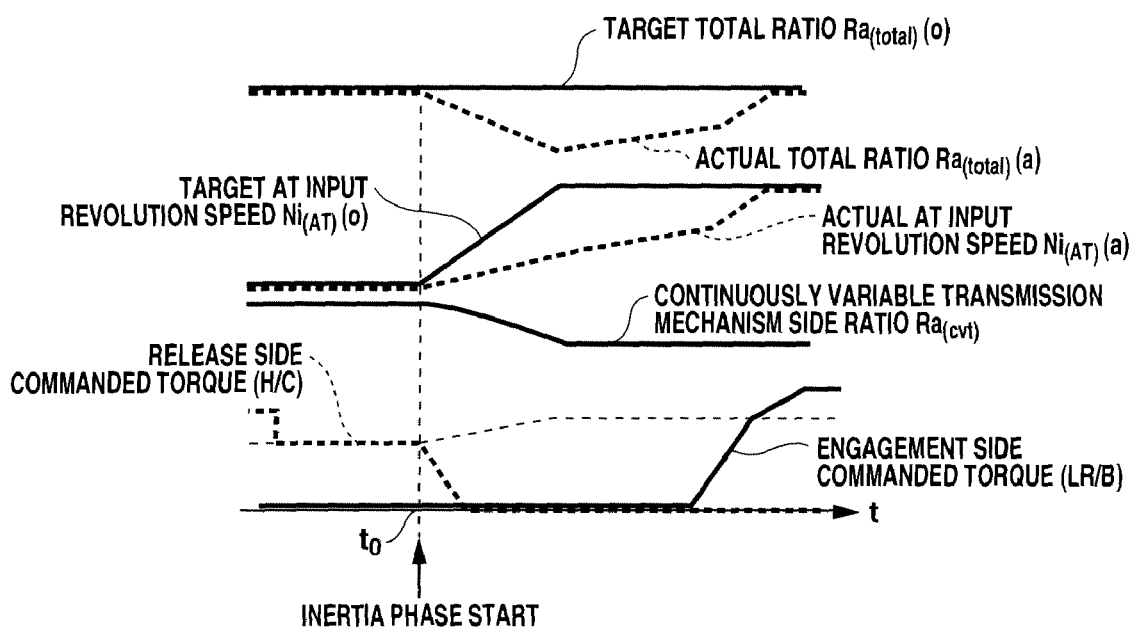

In addition, FIGS. 9A and 9B are a timing chart representing the operation of auxiliary transmission mechanism 9 when the commanded torque control in the comparative example to the preferred embodiment is carried out at a time of a power ON down shift operation and a timing chart representing the operation of the automatic transmission in the time series manner when the same control is executed as the automatic transmission at a time of the power ON up shift operation, respectively.

During the inertia phase of the power ON down shift, the power ON is resulted. Hence, input revolution speed $N_{i(AT)}$ of auxiliary transmission mechanism 9 is controlled by one of the engagement sections at the high-speed shift stage, namely, release side high clutch H/C (first engagement section).

Therefore, in this embodiment, as shown in FIG. 8A, the control side commanded torque is directly controlled by control side commanded torque $T_1$ until the commanded torque of release side high clutch H/C becomes zero (step S3) from a time at which the inertia phase is started ($t=t_0$). In addition, the to non-control side torque is directly controlled by non-control commanded torque $T_2$ (=0).

However, in a case where an absolute value of input torque $T_{i(AT)}$ is small, variations of actual input revolution speed (actual input revolution speed) $N_{i(AT)}(a)$ for the engagement section due to such as a, so-called, drag torque with respect to target input revolution speed $N_{i(AT)}$ (0) do not often advance when input torque $Ti_{(AT)}$ is minute or when the variations in the engagement sections such as the clutches or the brakes are provided, even if the commanded torque of release side high clutch H/C is made zero.

On the contrary, in the embodiment described above, even if the control side commanded torque of the release side high clutch H/C is reduced and crossed over (t=t1: step S4) zero, as shown in FIG. 8A, an absolute value $|T_1|$ of control side commanded torque $T_1$ (a dot-and-dash line of FIGS. 8A and 8B) is added to non-control side commanded torque $T_2$ for the engagement side low brake LR/B (second engagement section) to provide a non-control side commanded torque (step S4).

Thus, in this embodiment, even if the revolution variation of input revolution speed $N_{i(AT)}$ is controlled in a raise direction by means of the release side high clutch H/C but the revolution variation of actual input revolution speed $N_{i(AT)}(a)$ is not raised, the revolution variation of actual input revolution speed $N_{i(AT)}(a)$ is raised by the increase of the commanded torque of engagement-side low brake LR/B. Hence, auxiliary transmission mechanism 9 itself can make actual input revolution speed $N_{i(AT)}(a)$ as denoted by a dot line follow up target input revolution speed $N_{i(AT)}(O)$ denoted by a solid line without generation of a to large delay with respect to target input revolution speed $N_{i(AT)}(0)$ denoted by the solid line, as shown in FIG. 8A.

In addition, as viewed from automatic transmission 4, actual total ratio (hereinafter, actual total ratio) $Ra_{(total)}(a))$ can follow up, without generation of the large delay, a target total ratio (as denoted by a solid line) $Ra_{(total)}(0)$, as shown in FIG. 8A. That is to say, in this embodiment, a disturbance in the cooperative control for the gear shift with continuously variable transmission mechanism 8 can be suppressed.

On the contrary, in the comparative example, since only commanded torque $T_1$ at release side high clutch H/C (first engagement section) is controlled, the variation in actual input revolution speed $N_{i(AT)}(a)$ is not advanced with respect to target input revolution speed $N_{i(AT)}(0)$. At this time, it is impossible to control actual input revolution speed $N_{i(AT)}(a)$ by high clutch H/C in a direction in which the revolution speed variation is made faster.

Hence, in auxiliary transmission mechanism 9 itself, the large delay occurs in actual input revolution speed $N_{i(AT)}(a)$ as denoted by the dot line with respect to target input revolution speed $N_{i(AT)}(O)$ denoted by the solid line, as shown in FIG. 9A. In addition, as viewed from automatic transmission 4, the large delay occurs in auxiliary transmission mechanism 9 itself. A large variation occurs in actual total ratio $Ra_{(total)}(a)$ denoted by the dot line with respect to target total ratio $Ra_{(total)}(O)$ denoted by the solid line, as shown in FIG. 9B. Thus, in the comparative example, the disturbance in the cooperative control with the gear shift in continuously variable transmission mechanism 8 often occurs.

Figure 10A:
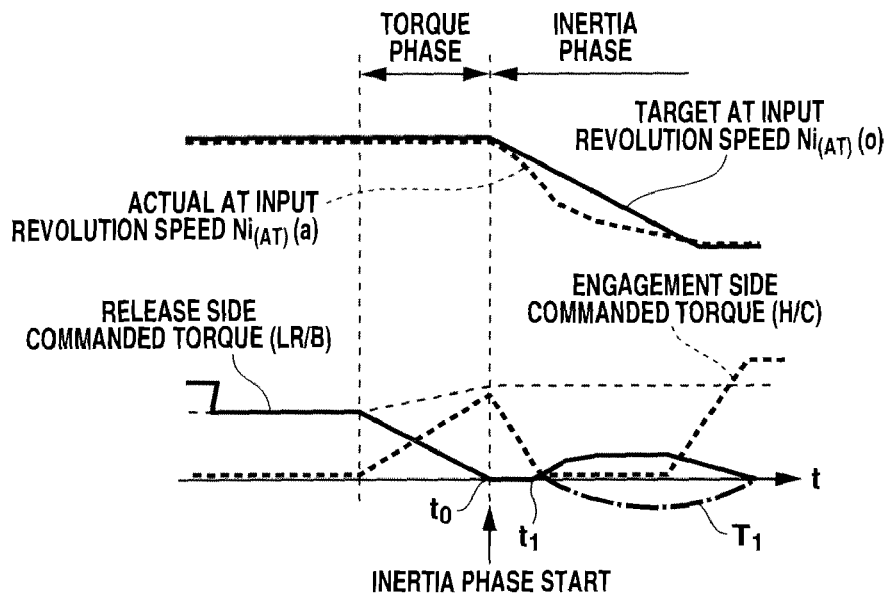
FIGS. 10A and 10B are a timing chart representing the operation of the auxiliary transmission mechanism in the time series manner when the commanded torque control in the comparative example to the preferred embodiment is carried out during the power ON up shift operation and a timing chart representing the operation of the automatic transmission in the time series manner when the same control is executed during the power ON up shift operation, respectively.
Figure 10B:
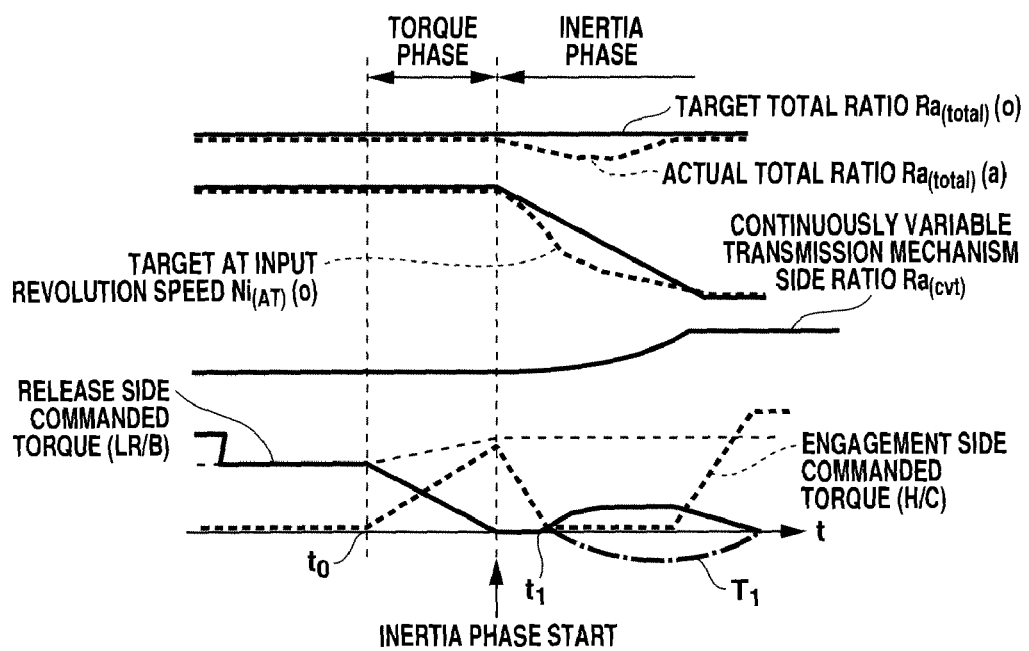

Furthermore, FIGS. 10A and 10B are a timing chart representing the operation of the auxiliary transmission mechanism in the time series manner when the commanded torque control in the comparative example to the preferred embodiment is carried out during the power ON up shift operation and a timing chart representing the operation of the automatic transmission in the time series manner when the same control is executed during the power ON up shift operation, respectively.

Figure 11A:
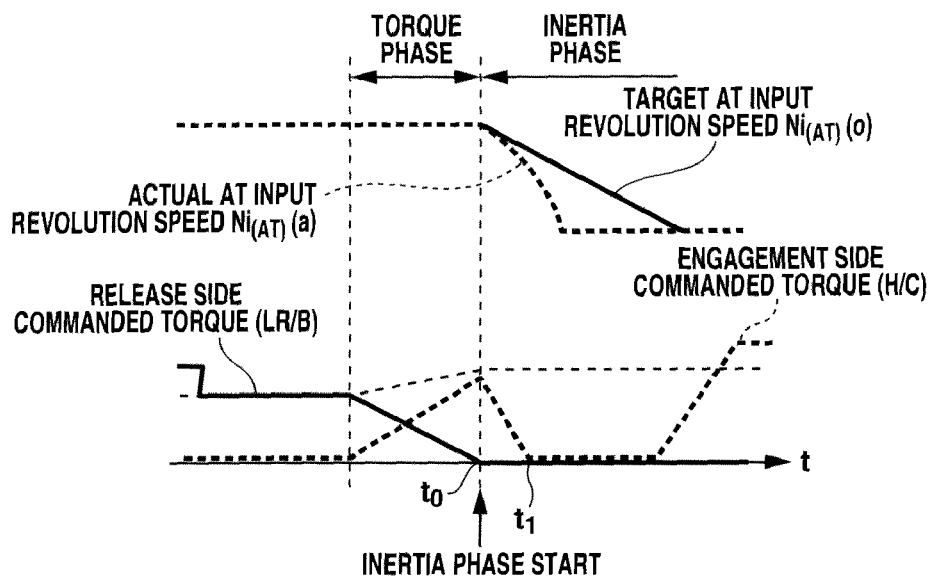
FIGS. 11A and 11B are a timing chart representing the operation of the auxiliary transmission mechanism in the time series manner when the commanded torque control of the comparative example to the preferred embodiment is carried out during the power ON up shift operation and a timing chart representing the operation of the automatic transmission when the same control is executed as the to automatic transmission during the power ON up shift operation, respectively.
Figure 11B:
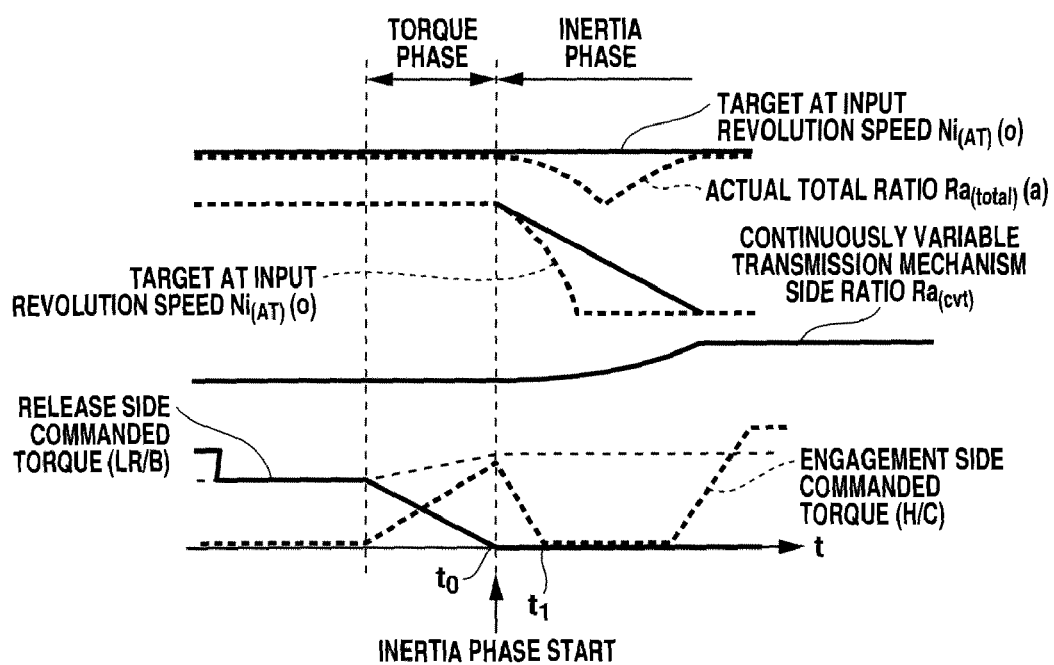

In addition, FIGS. 11A and 11B are a timing chart representing the operation of the auxiliary transmission mechanism in the time series manner when the commanded torque control of the comparative example to the preferred embodiment is carried out during the power ON up shift operation and a timing chart representing the operation of the automatic transmission when the same control is executed as the automatic transmission during the power ON up shift operation, respectively.

During the inertia phase of power ON state, the power is in the ON state. Therefore, input revolution speed $N_{i(AT)}$ of auxiliary transmission 9 is controlled by the engagement section at a high-speed stage side, namely, the engagement side high clutch H/C (second engagement section).

In this embodiment, the inertia phase is preceded by a torque phase in which input torque $T_{i(AT)}$ of auxiliary transmission mechanism 9 is distributed into low brake LR/B and high clutch H/C to perform a torque replacement, as shown in FIG. 10A. Thereafter, upon the start of the inertia phase ($t=t_0$), the control side commanded torque is directly controlled to be the control side commanded torque $T_1$ and the non-control side commanded torque is directly controlled to be the non-control side commanded torque $T_2$ (=0).

However, in a case where the absolute value of is input torque $T_{i(AT)}$ is small, the revolution change of actual input revolution speed $N_{i(AT)}(a)$ with respect to target input revolution speed $N_{i(AT)}(O)$ often becomes abrupt due to, so-called, the drag torque when the input torque itself $T_{i(AT)}$ is minute (even if the command torque of the engagement side high clutch H/C is made zero) or when the variations in the engagement sections such as the clutches or brakes occur.

On the contrary, in this embodiment, as shown in FIG. 10A, when the control side command torque of the engagement side high clutch H/C is below zero ($t=t_1$: step S4), absolute value $|t_1|$ (a dot-and-dash line of FIGS. 10A and 10B) of the control side commanded torque $T_1$ is added to the non-control side commanded torque $T_2$ of the non-control release side low brake LR/B (first engagement section) to provide the non-control side commanded torque (step S4).

Thus, although actual input revolution speed change $N_{i(AT)}$(a) is reduced in a direction reducing the revolution variation of input revolution speed $N_{i(AT)}$ by means of release side low brake LR/B, the commanded torque of high clutch H/C at the engagement side is reduced. Hence, in auxiliary transmission mechanism 9 itself, the follow up of actual input revolution speed $N_{i(AT)}$(a) to target input revolution speed $N_{i(AT)}$(O) denoted by the solid line as denoted by the dot line can be achieved, as shown in FIG. 10(A).

In addition, as viewed from automatic transmission 4, as denoted by the dot line, actual total ratio $Ra_{(total)}$(a), as shown in FIG. 10B, can follow up target total ratio $Ra_{(total)}$(0) as denoted by the solid line without generation of a large delay. That is to say, in this embodiment, the disturbance in the cooperative control with the gear shift at continuously variable transmission mechanism 8 can be suppressed.

It should be noted that, as in the case of the present invention, absolute value of control side commanded torque $T_1$ is added to non-control side commanded torque $T_2$ so that input revolution speed $N_{i(AT)}$ reaches to target input revolution speed $N_{i(AT)}$(O) and the inertia phase is ended. In this case, in the same way as the torque phase of an ordinary power ON up shift, the engagement side commanded torque is raised to the engagement side torque capacity having the predetermined margin and the gear shift is ended while the engagement side commanded torque is raised to the engagement torque capacity having the predetermined margin to end the gear shift while the end phase is made earlier.

On the contrary, in the comparative example, since only commanded torque of engagement side high clutch H/C (second engagement section) is controlled, the variation in actual input revolution speed $N_{i(AT)}$(a) becomes abrupt with respect to target input revolution speed $N_{i(AT)}$(O) denoted by the solid line and it becomes impossible to control high clutch H/C in the direction to reduce target input revolution speed $N_{i(AT)}$ (0) denoted by the solid line.

A large advance of actual total ratio $Ra_{(total)}$ (a) denoted by the solid line shown in FIG. 11A with respect to target total ratio $Ra_{(total)}$(O) occurs. Thus, in the comparative example, the disturbance of the corporative control with the gear shift at continuously variable transmission mechanism 8 often occurs.

Figure 12A:
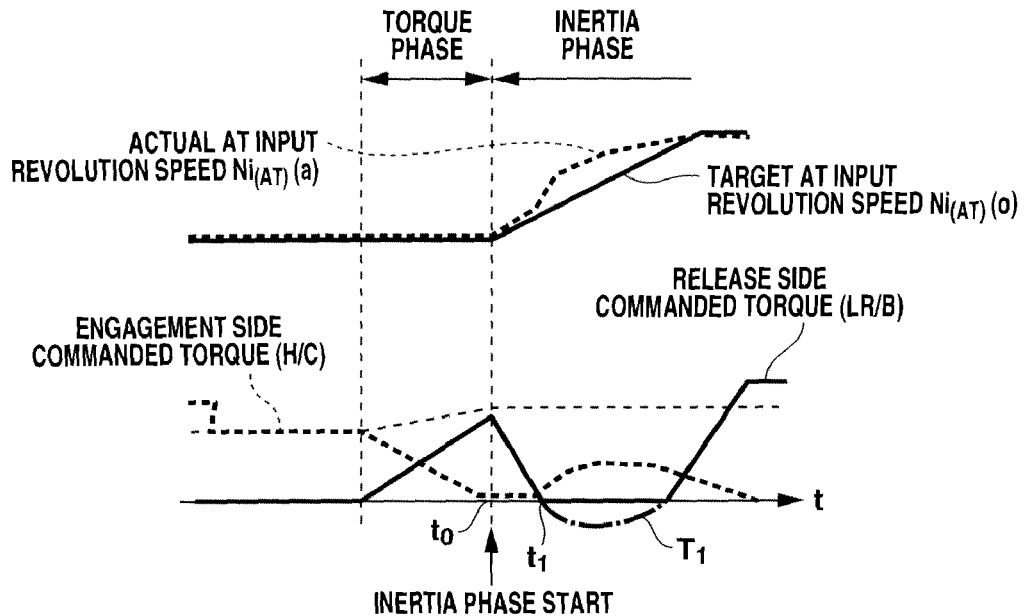
FIGS. 12A and 12B are a timing chart representing the operation of the auxiliary transmission mechanism in the time series manner when the commanded torque control in accordance with the present invention is carried out during the power OFF down shift operation and a timing chart representing the operation of the automatic transmission in the time series manner when the same control is executed during the power OFF down shift operation, respectively.
Figure 12B:
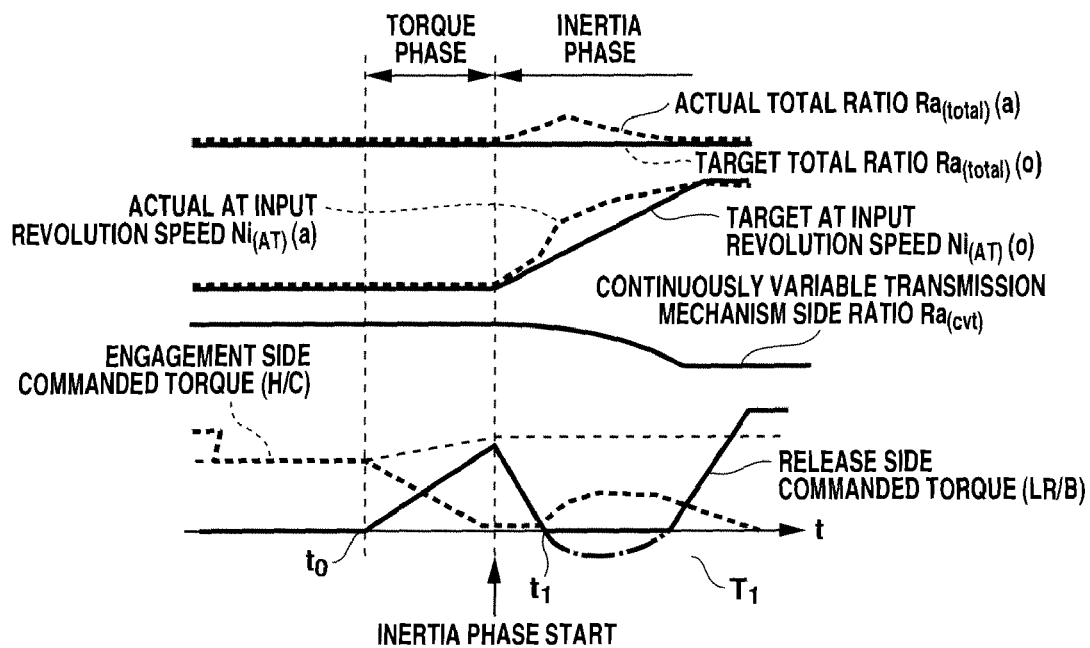

FIGS. 12A and 12B a timing chart representing the operation of the auxiliary transmission mechanism in the time series manner when the commanded torque control in accordance with the present invention is carried out during the power OFF down shift operation and a timing chart representing the operation of the automatic transmission in the time series manner when the same control is executed during the power OFF down shift operation, respectively.

Figure 13A:
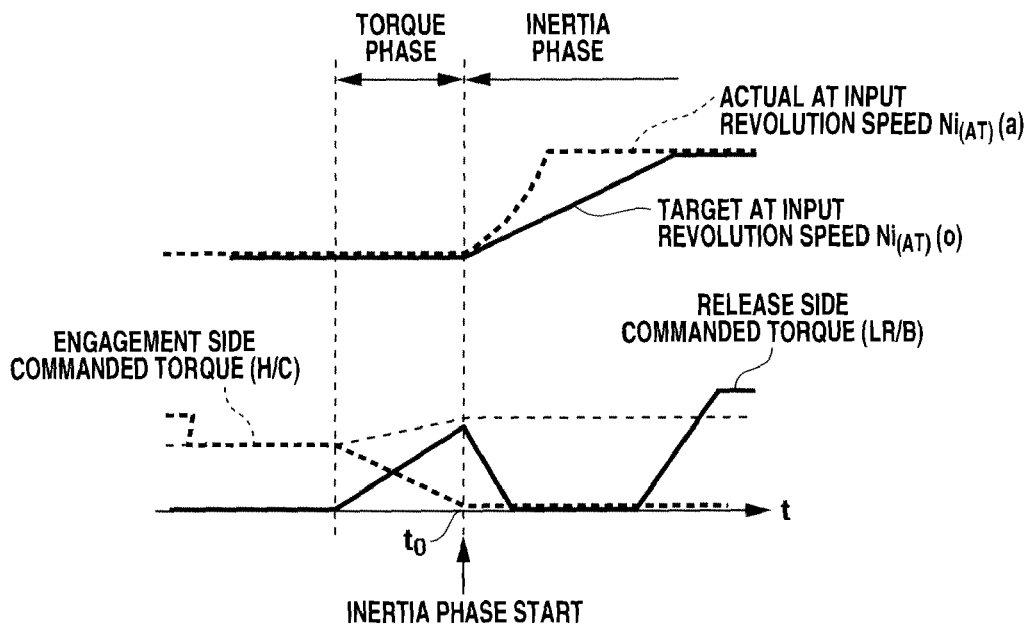
FIGS. 13A and 13B are a timing chart representing the operation of the auxiliary transmission mechanism in the time series manner when the commanded torque control of the comparative example to the preferred embodiment is carried out during the power OFF down shift operation and a timing chart representing the operation of the automatic transmission when the same control is executed as the automatic transmission during the power OFF down shift operation, respectively.
Figure 13B:
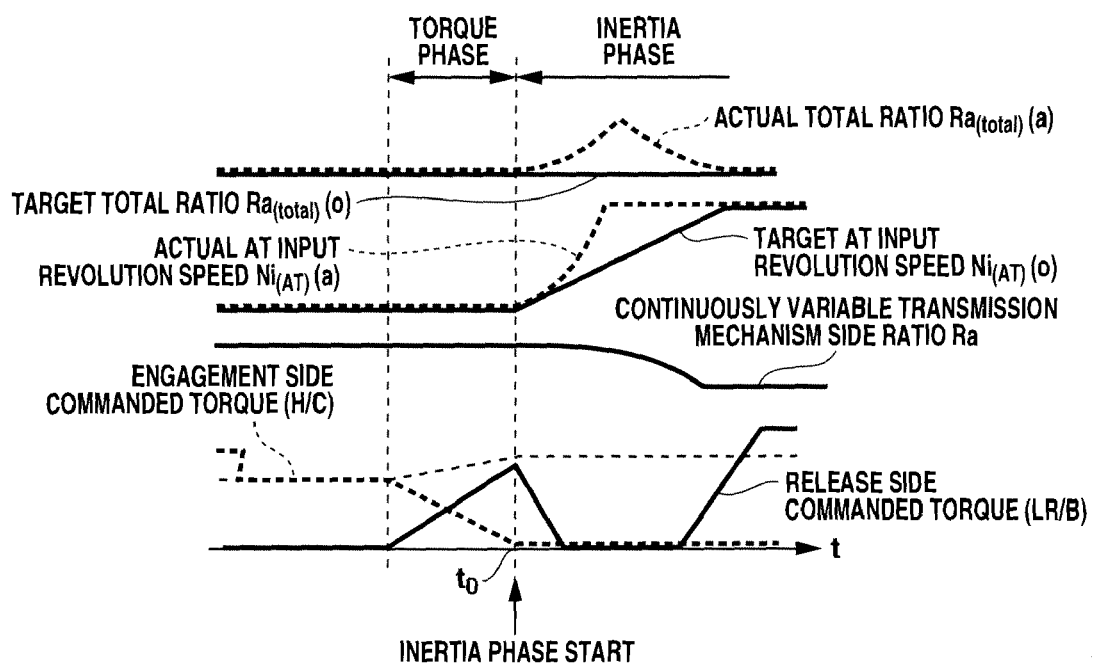

In addition, FIGS. 13A and 13B are a timing chart representing the operation of the auxiliary transmission mechanism in the time series manner when the commanded torque control of the comparative example to the preferred embodiment is carried out during the power OFF down shift operation and a timing chart representing the operation of the automatic transmission when the same control is executed as the automatic transmission during the power OFF down shift operation, respectively.

During the inertia phase of power OFF down shift, the power is in the OFF state. Then, input revolution speed $N_{i(AT)}$ of auxiliary transmission mechanism 9 is controlled at the engagement side low brake L/B (second engagement section), namely, the engagement section at the low-speed stage side.

Therefore, as shown in FIG. 12A, the torque phase is preceded by the inertia phase and, thereafter, the inertia phase is started ($t=t_0$). Until the control side commanded torque at the release side becomes zero (step S3), control side commanded torque is directly controlled at control side commanded torque $T_1$ and the non-control side commanded torque is directly controlled at the non-control side commanded torque $T_2$ (=0).

However, even in a case where absolute value of input torque $T_{i(AT)}$ is small, when commanded torque of engagement side low brake LB/R is made zero, a variation in the engagement section such as the clutch or brake, the so-called drag torque makes the variation of actual input revolution speed $N_{i(AT)}$ (a) with respect to target input revolution speed $N_{i(AT)}$(0) often becomes abrupt.

On the contrary, in this embodiment, as shown in FIG. 12A, when the control side commanded torque of low brake LR/B at the engagement side is reduced and becomes below zero ($t=t_1$: step S4), absolute value $|T_1|$ (dot-and-dash line in FIG. 8) of control side command torque $T_1$ of release side high clutch H/C (first engagement section) is added to non-control side command torque $T_2$ of release side high clutch H/C (first engagement section) at the non-control side to provide non-control side commanded torque (step S4).

Thus, although low brake LR/B at the engagement side (second engagement section) is controlled in the direction to reduce the variation in the revolution of actual input revolution speed $N_{i(AT)}$(a) at the engagement side, the commanded torque of high clutch H/C at the release side is increased to reduce the revolution variation of the actual input revolution speed. Hence, auxiliary transmission mechanism 9 itself can cause actual input revolution speed $N_{i(AT)}$(0) denoted by the solid line with respect to target input revolution speed $N_{i(AT)}$ (0) denoted by the solid line to be followed without a large advance, as shown in FIG. 12A.

In addition, as viewed as automatic transmission 4, as shown in FIG. 12B, actual total ratio is $Ra_{(total)}$(a), as denoted by the broken line, can follow up target total ratio $Ra_{(total)}$(O) denoted by the solid line without the large variation. That is to say, in this embodiment, the disturbance in the corporative control with the gear shift at continuously variable transmission mechanism 8 can be suppressed.

On the contrary, in the comparative example, since commanded torque $T_1$ only at the low brake LR/B (second engagement section) engagement side is controlled, it becomes impossible to control in the direction to reduce the revolution variation when the variation of actual input revolution speed $N_{i(AT)}$(a) denoted by the broken line is abrupt with respect to target input revolution speed $N_{i(AT)}$(O).

Hence, in auxiliary transmission mechanism 9 itself, as shown in FIG. 13A, the large advance to target input revolution speed $N_{i(AT)}$(O) denoted by the solid line as denoted by the dot line occurs. In addition, as viewed from automatic transmission 4, the large advance in auxiliary transmission mechanism 9 itself occurs. As shown in FIG. 13B, the large variation for target total ratio $Ra_{(total)}$(0) denoted by the solid line occurs. Hence, in the comparative example, the disturbance in the corporative control with the gear shift at continuously variable transmission mechanism 8 often occurs.

In other words, whether the control side engagement section can control input revolution speed $N_{i(AT)}$ can be determined according to whether a target value of a capacity engagement section has reached to zero but also can be determined according to whether the target value of the capacity of the engagement section has reached to a predetermined value.

Figure 14:
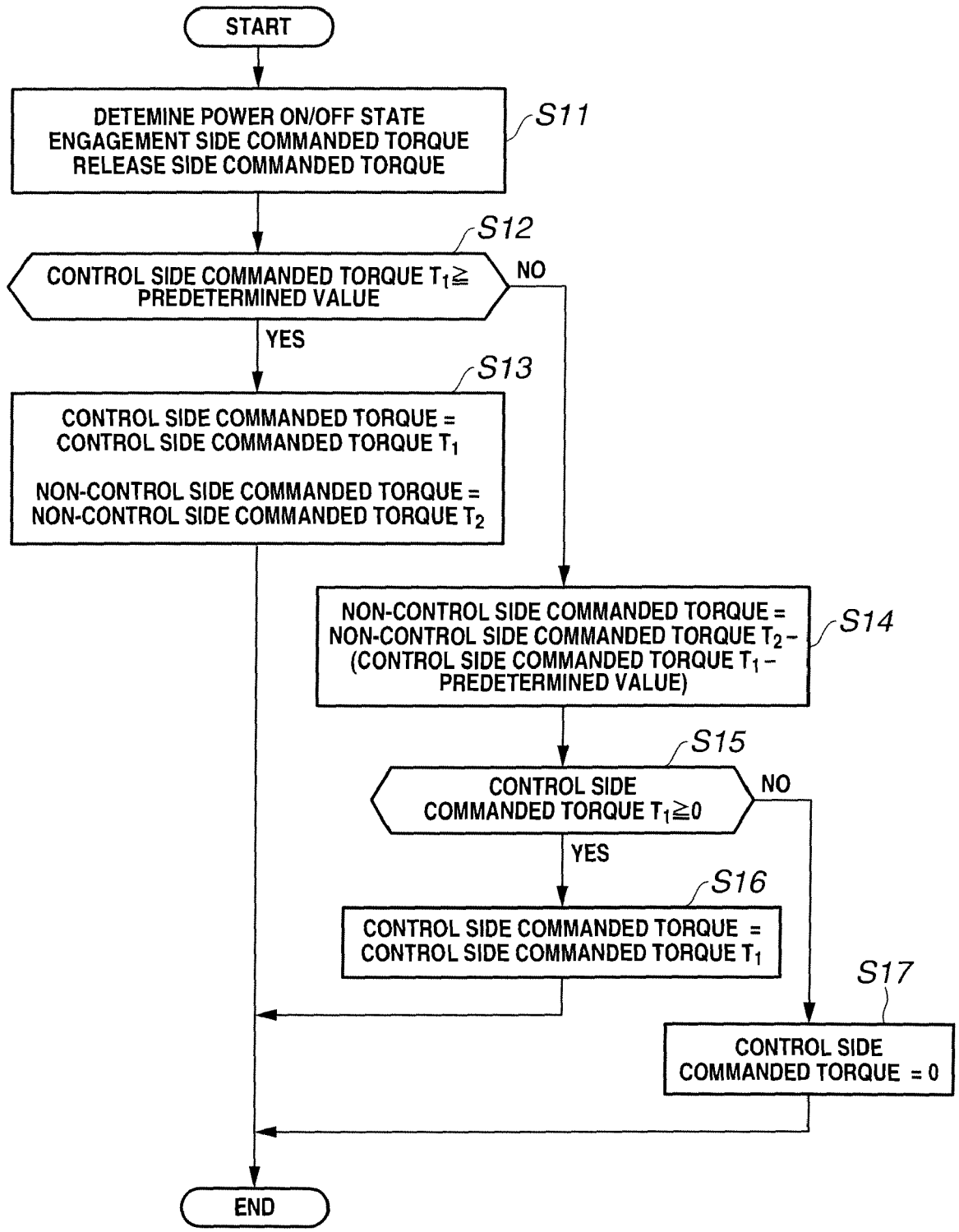
FIG. 14 is a flowchart representing another torque distribution control flow in accordance with the present invention and being executed in a replacement gear shift control of the control apparatus in the preferred embodiment shown in FIG. 1.

FIG. 14 is a flowchart representing another torque distribution control in accordance with the present invention. Hereinafter, the replacement gear shift control will be explained with reference to the flowchart shown in FIG. 14. It should be noted that duty (D) controls for the solenoid valves of hydraulic pressure control valve unit 10 are executed on a basis of command values processed by transmission controller 11.

At a step S11, in the same way as step S1 in FIG. 5, transmission controller 11 reads a power ON/OFF state, engagement side command torque Tc, and release side command torque Tr and sets the control side engagement section and non-control side engagement section which controls input revolution speed $N_{i(AT)}$ in accordance with the read power ON/OFF.

At a step S12, the determination of whether the control side engagement section can control input revolution speed $N_{i(AT)}$ at the control side engagement section is made in the same way as step S2 in FIG. 5. In this embodiment, the control side engagement section provides a capacity target value which reduces the commanded torque of the control side engagement section below the predetermined value. The predetermined value includes a value at which a compatibility between a prevention of the shift shock and a revolution following capability can be established. The predetermined value can be derived empirically. In addition, by deriving an allowable interlock, the predetermined value can be set within this range of the derived allowable interlock.

At step S12, if control side commanded torque $T_1$ is equal to or above the predetermined value, control side commanded torque $T_1$ and non-control side commanded torque $T_2$ calculated at step S11 are directly set in a step S13 as the control side commanded torque and the non-control side commanded torque in the same way as step S3 in FIG. 5.

At step S12, when control side command torque $T_1$ is below the predetermined value, there is a possibility that input revolution speed $N_{i(AT)}$ cannot be controlled to follow up target input revolution speed $N_{i(AT)}(O)$ and the routine goes to a step S14. At step S14, the predetermined value is subtracted from control side command torque $T_1$ to derive a difference between control side command torque $T_1$ and the predetermined value and sets the value by which the difference is, furthermore, subtracted from the non-control side commanded torque $T_2$ as the non-control side commanded torque.

At a step S15, transmission controller 11 determines whether control-side commanded torque $T_1$ is equal to or higher than zero. If control-side commanded torque $T_1$ is equal to or larger than zero at step S15, there is room of being still capable of controlling input revolution speed $N_{i(AT)}$ by commanded torque $T_1$ and, at a step S16, control side commanded torque $T_1$ is directly set as control-side commanded torque.

If control side commanded torque $T_1$ is below zero at step S15, the routine goes to a step S17. At step S17, the control side commanded torque is set to zero since, even though the control side engagement section is controlled by commanded torque $T_1$, input revolution speed $N_{i(AT)}$ cannot be controlled to follow up target value $N_{i(AT)}(O)$ and the control side command torque is set to zero. That is to say, when control side commanded torque $T_1$ is below zero, the control side commanded torque is set to commanded torque $T_1$ or zero since input revolution speed $N_{i(AT)}$ cannot be controlled even if control side commanded torque is controlled by commanded torque $T_1$ in the same way as the control shown in FIG. 5 and a value to which absolute value of control side commanded torque $T_1$ is added is set to a non-control side commanded torque, namely, $T_2(C)(=T_2+|T_1|))$.

Thus, the replacement gear shift control is executed on a basis of control side commanded torque and non-control side commanded torque in auxiliary transmission mechanism 9. It should also be noted that, in this embodiment, as will be described later, the above-described control side commanded torque and non-control side commanded torque are converted into hydraulic pressure and this hydraulic pressure provides the commanded hydraulic pressure to execute the replacement gear shift control for auxiliary transmission mechanism 9.

Figure 15:
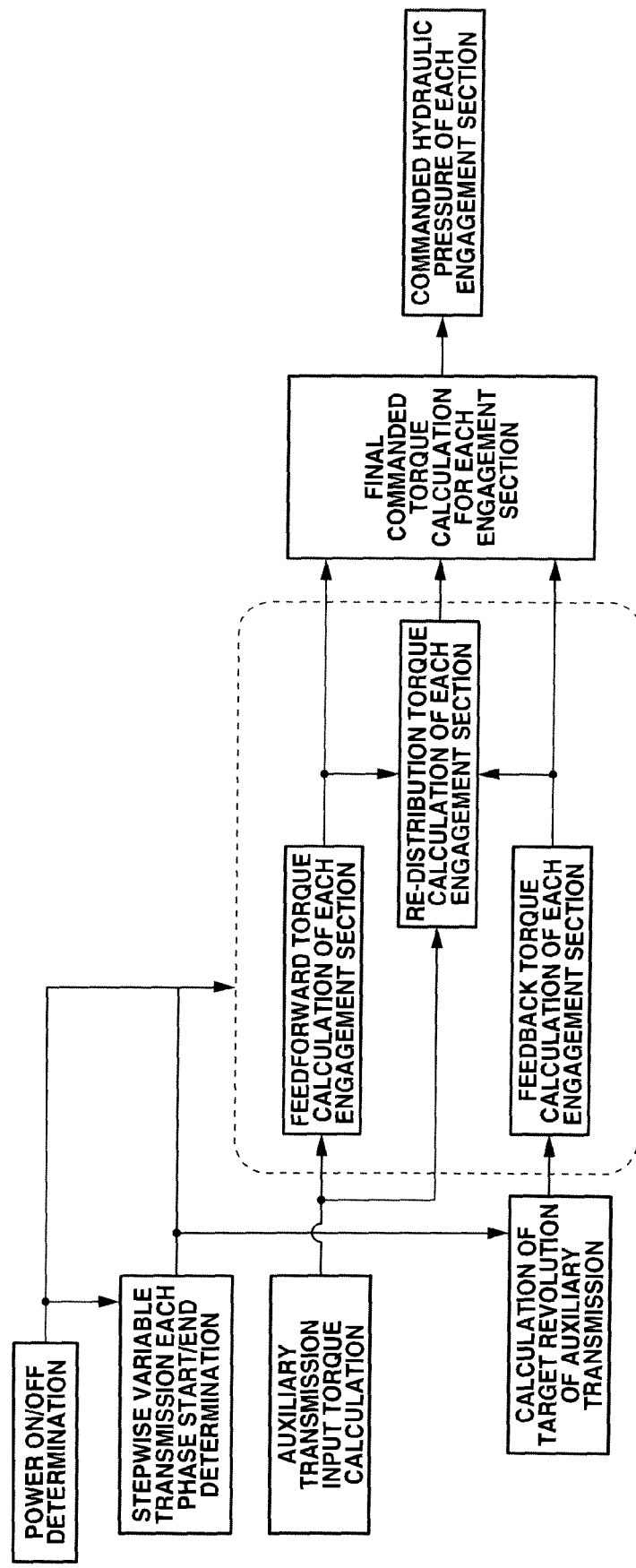
FIG. 15 is a control diagram representing a calculation method of commanded hydraulic pressures executed in a transmission controller shown in FIG. 2 for release side and engagement side engagement sections along with the switching between the power ON and OFF.
Figure 16A:
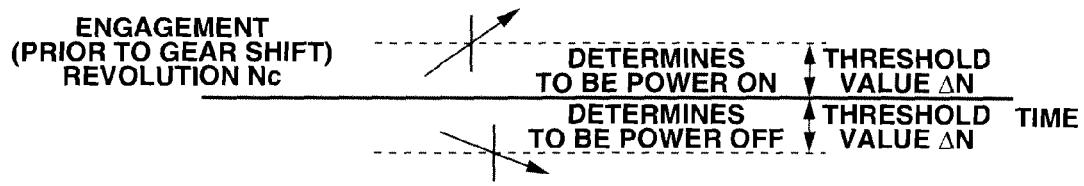
FIGS. 16A and 16B are explanatory views for the power ON and OFF state determination methods during no gear shift, during a gear shift into which a gear shift control enters a torque phase or an inertia phase, respectively.
Figure 16B:
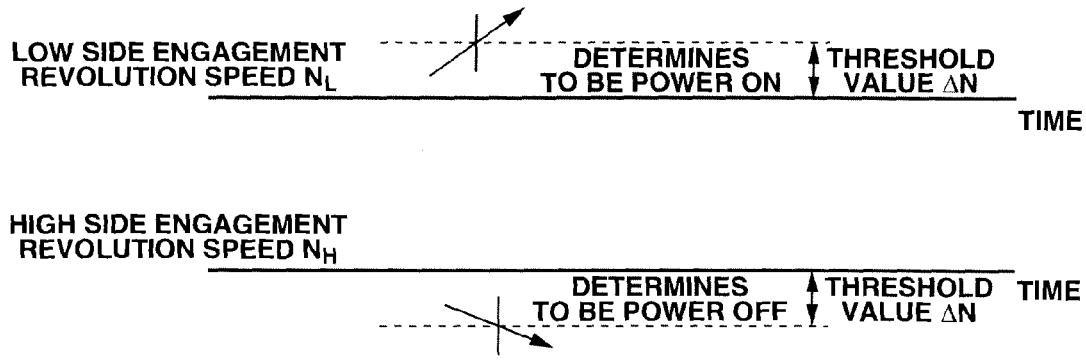

It should be noted that the commanded hydraulic pressure for each of release side and engagement side engagement sections is arithmetically processed along with the stream of the flow of FIG. 15 and is controlled by commanding this to hydraulic pressure control valve unit 10.

The commanded hydraulic pressures at the release side and at the engagement side are calculated on the basis of commanded torques at the engagement side and at the release side. In addition, the commanded torque at the engagement side and the commanded torque at the release side are calculated on the basis of an F/F (feed-forward) torque given by a feed-forward control, an F/B (feedback) torque given by the feedback control, and a re-distribution torque which is re-distributed depending on whether the control side engagement section can control input revolution speed $N_{i(AT)}$.

The feed-forward (F/F) torque is determined on a basis of an input torque $T_{i(AT)}$ (an input torque $T_1$ of automatic transmission 4) of auxiliary transmission mechanism 9 that is always calculated. In addition, the F/B (feedback) torque is determined on a basis of target input revolution speed $N_{i(AT)}$ (O) of auxiliary transmission mechanism 9 (in this embodiment, target input revolution speed $N_{i(O)}$ of automatic transmission 4) calculated on a basis of throttle opening angle TVO and vehicle speed VSP.

In addition, both of F/F (feed-forward) torque and F/B (feedback) torque are calculated in response to a determination of whether the power ON or OFF state. Furthermore, target input revolution speed $N_{i(AT)}(O)$ of auxiliary transmission mechanism 9 is calculated in response to the determination of whether the start or the end of each phase of auxiliary transmission mechanism 9 or along with the determination of whether the power is in ON state or in OFF state. Furthermore, re-distribution torque is calculated on a basis of each of the control flows shown in FIGS. 5 and 14.

As described above, according to the present invention, even though the capacity of the control side engagement section of either the first or second engagement section is controlled, input revolution speed $N_{i(AT)}$ cannot be determined to the target value $N_{i(AT)}(O)$. At this time, the capacity of the non-control side engagement section which is the other engagement section is increased so that the variation of actual input revolution speed $N_{i(AT)}(a)$ with respect to target input revolution speed $N_{i(AT)}(O)$ becomes abrupt. At this time, the revolution variation is controlled in the direction to reduce the revolution variation. When the variation of actual input revolution speed $N_{i(AT)}(a)$ with respect to target input revolution speed $N_{i(AT)}(0)$, the input revolution speed can be controlled to be the direction in which the variation of revolution is advanced (becomes faster.

Hence, according to the present invention, the smooth shift without the unpleasant feeling given to vehicular occupants becomes possible since the target gear shift can be achieved at the intended shift speed.

In addition, as shown in the embodiment shown in FIG. 14, if the control apparatus is configured to determine that input revolution speed $N_{i(AT)}$ cannot follow target input revolution speed $N_{i(AT)}(O)$ at either one of the first and second engagement sections when the capacity target value of the engagement section has reached to the predetermined value. The predetermined value is appropriately modified. Thus, an application range in which the other non-control side engagement section can assist by means of the other non-control side engagement section can be expanded. Thus, if the predetermined value is determined empirically and the compatibility between the prevention of the gear shift shock and following capability of revolution can be achieved. In addition, after the allowable interlock torque is determined, the setting in this range can be achieved.

Especially, as shown in the embodiment in FIG. 5, if the predetermined value provides the capacity target value when the capacity of the control side engagement section is reduced to zero, a more accurate determination can be made that input revolution speed $N_{i(AT)}$ cannot provide value $N_{i(AT)}$ which is the target value.

In addition, when the capacity target value of control side engagement section is reduced and becomes not be equal to or larger than the predetermined value (zero value), the capacity thereof can be increased by the addition of the capacity value below the predetermined value to the capacity of the non-control side engagement section. Naturally, for example, since the inertia phase is ended, even if the inertia phase is ended, if actual input revolution speed does not reach to the target input revolution speed $N_{i(AT)}(0)$, the non-control side engagement section assists the insufficient quantity of the control side engagement section. Hence, target input revolution speed $N_{i(AT)}(O)$ can be achieved without the deviation of actual input revolution speed $N_{i(AT)}(O)$ from input revolution speed $N_{i(AT)}(0)$.

Furthermore, as shown in the embodiment, if automatic transmission mechanism 4 having auxiliary transmission mechanism 9 which is the stepwise variable transmission mechanism and having continuously variable transmission mechanism 8 in which the gear shift control is carried out to achieve target gear shift ratio $I_0$ with the cooperative shift with the gear shift control is applied, as described above, the gear shift at auxiliary transmission mechanism 9 is carried out at the intended shift speed. Thus, the generation of the disturbance in the cooperative control with the shift in continuously variable transmission mechanism 8 can be suppressed. This permits the smooth gear shift to be achieved as if continuously variable transmission mechanism 8 carried out the shift of continuously variable transmission mechanism 8.

On the contrary, although the power ON or OFF can be determined according to a manipulation on an accelerator pedal. However, if the manipulation on the accelerator pedal is small, the switching between the power ON and OFF cannot actually be determined irrespective of the switching states of the power.

Whereas, the engagement section such as the clutch or the brake has a function of equalizing the input and output revolution speeds. Hence, in this embodiment, the variation in the revolution speed of auxiliary transmission 8 causes the power ON or OFF state according to the variation of the revolution speed.

As a specific example, during the non-gear shift during which no replacement gear shift is made or during the preparation phase before the entrance of the torque phase or the inertia phase, upon the determination of the gear shift during the execution of the replacement of gear shift, transmission controller 11 determines that the power is turned to ON when automatic transmission input revolution speed Ni with respect to this engagement revolution speed Nc is raised by a value equal to or larger than a threshold value $\Delta N$ on a basis of engagement side revolution speed Nc of the engagement section (low brake LR/B) of auxiliary transmission mechanism 9. Transmission controller 11 determines that the power is turned to ON and, if automatic transmission input revolution speed Ni is reduced to threshold value $\Delta N$ or lower, transmission controller 11 determines that the power is turned to OFF state.

In addition, during the gear shift during which the control phase enters the torque phase or the inertia phase, if automatic transmission input revolution speed Ni with respect to this engagement revolution speed $N_{c(Low)}$ is equal to or larger than preset threshold value $\Delta N$, transmission controller 11 corresponds to power ON/OFF state determining means (section).

As described in this embodiment, from the variation of the revolution speed of auxiliary transmission mechanism 9, the power ON/OFF state is determined. Even in this case, the accurate determination of the power ON/OFF state can be made even if the torque inputted from the drive source such as the engine to auxiliary transmission mechanism 9 is a small value in the vicinity to zero. It should be noted that threshold value $\Delta N$ can approximately be modified according to the demand from the driver and kinds of vehicles. In addition, threshold value $\Delta N$ can accurately be determined. For example, slips in low brake R/B or high clutch H/C can more accurately be determined and threshold value $\Delta N$ can be set to a small value (for example, 20~50 revolutions).

As described above, the preferred embodiment according to the present invention has been described. Various modifications can be added in the scope of the claims. According to the present invention, for example, auxiliary transmission 4 can be applied to a case of a use of auxiliary transmission mechanism 9 itself. It should be noted that, in a case where auxiliary transmission mechanism 9 is used as automatic transmission 4, the input revolution speed such as the target input revolution speed to be controlled is the input revolution speed of auxiliary transmission mechanism 9. In addition, it is possible to apply a multi-stage auxiliary transmission mechanism with a multiple stage equal to or larger than 2-nd speed to auxiliary transmission mechanism.

Although, in order to control a gear shift state in the inertia phase, the input revolution speed of the stepwise variable transmission is controlled. The present invention does not limit the above-describe feature. For example, in place of the input revolution speed, the gear shift ratio to be controlled is used. Specifically, the gear shift ratio during the inertia phase is controlled to be the target gear shift ratio so that the gear shift state during the inertia phase is controlled to be the target gear shift state. In addition, in place of the input revolution speed, a gear shift speed (variation percentage of the gear shift ratio) may be controlled. Specifically, the gear shift speed may be controlled for the gear shift speed during the inertia phase to become equal to a target gear shift speed so that the gear shift state during the inertia phase may be controlled to be the target gear shift state.

This application is based on a prior Japanese Patent Application No. 2009-054057 filed in Japan on Mar. 6, 2009. The entire contents of this Japanese Patent Application No. 2009-054057 are hereby incorporated by reference. Although the invention has been described above by reference to certain embodiments of the invention, the present invention is not limited to the embodiment described above. Modifications and variations of the embodiments described above will occur to those skilled in the art in light of the above teachings. The scope of the invention is defined with reference to the following claims.

What is claimed is:

1. A control apparatus for an automatic transmission, comprising: a stepwise variable transmission mechanism including a plurality of engagement sections, each of the engagement sections being engaged according to an increase in a capacity of a corresponding one of the engagement sections while being released according to a reduction in the capacity of corresponding another of the engagement sections and a target gear shift state being determined according to a combination of release and engagement of the respective engagement sections; and a control section configured to control a gear shift state of the stepwise variable transmission mechanism to become equal to the target gear shift state by releasing a first engagement section of the engagement sections according to a reduction in the capacity of the first engagement section and, simultaneously, by engaging a second engagement section of the engagement sections according to an increase in the capacity of the second engagement section, in accordance with a torque inputted to the stepwise variable transmission mechanism, the control section, during an inertia phase when the stepwise variable transmission mechanism is gear shift controlled, making either one of the first and second engagement sections function to be a gear shift state control side engagement section and being configured to increase the capacity of a gear shift non-control side engagement section which is the other of the first and second engagement sections when determining that it is impossible to make the gear shift state of the stepwise variable transmission mechanism follow up the target gear shift state at the gear shift state control side engagement section.

2. The control apparatus for the automatic transmission as claimed in claim 1, wherein the gear shift state includes an input revolution speed of the stepwise variable transmission mechanism.

3. The control apparatus for the automatic transmission as claimed in claim 2, wherein a determination that it is impossible to make the gear shift state of the stepwise variable transmission mechanism follow up the target gear shift state at the gear shift state control side engagement section is based on a determination that a target value of the capacity of the gear shift state control side engagement section has reached to a predetermined value.

4. The control apparatus for the automatic transmission as claimed in claim 3, wherein the predetermined value is a capacity target value when the capacity of the gear shift control side engagement section is reduced to zero.

5. The control apparatus for the automatic transmission as claimed in claim 3, wherein the control section increases the capacity of a gear shift state non-control side engagement section by adding a quantity corresponding to the reduction in the capacity of the gear shift state control side engagement section below the predetermined value to the capacity of the gear shift state non-control side engagement section, when the target value of the capacity of the gear shift state control side engagement section is reduced and is below the predetermined value.

6. The control apparatus for the automatic transmission as claimed in claim 2, wherein the control apparatus further comprises a continuously variable transmission mechanism in which a gear shift control to achieve a target gear shift ratio is performed with a cooperation of a gear shift control for the stepwise variable transmission mechanism.

7. The control apparatus for the automatic transmission as claimed in claim 2, wherein the control section comprises: a read section configured to read a power ON state in which a throttle valve opening angle is opened to a predetermined opening angle or larger or a power OFF state in which the throttle valve opening angle is directed toward a complete closure state, configured to read an engagement side commanded torque commanded to one of the engagement sections whose state is transferred from a release state to an engagement state, and configured to read a release side command torque commanded to one of the engagement sections whose state is transferred from the engagement state to the release state; and a first setting section configured to set either one of the first and second engagement sections to the gear shift state control side engagement section and set the other one of the first and second engagement sections to the gear shift state non-control side engagement section, in accordance with the read power ON or OFF state, the first engagement section being constituted by a release side engagement section of the engagement sections and the second engagement section being constituted by an engagement side engagement section of the engagement sections.

8. The control apparatus for the automatic transmission as claimed in claim 7, wherein the control section further comprises: a first determination section configured to determine whether a following up control for input revolution speed to follow up the target input revolution speed is achievable by the control for the gear shift state control side engagement section.

9. The control apparatus for the automatic transmission as claimed in claim 8, wherein the control section further comprises: a second determination section configured to determine whether a control side commanded torque of the gear shift state control side engagement section is equal to or larger than zero to determine whether the control for the gear shift state control side engagement section permits the input revolution speed of the automatic transmission to follow up the target input revolution speed.

10. The control apparatus for the automatic transmission as claimed in claim 9, wherein the control section further comprises: a second setting section configured to set directly the control side commanded torque to the control side commanded torque and to set directly a non-control side commanded torque to the non-control side commanded torque, when the second determination section determines that the control side commanded torque is equal to or larger than zero.

11. The control apparatus for the automatic transmission as claimed in claim 10, wherein the control section further comprises: a third setting section configured to set the control side commanded torque to zero and configured to set a non-control side commanded torque to a value of subtraction of control side commanded torque from the non-control side commanded torque when the second determination section determines that the control side commanded torque is smaller than zero.

12. The control apparatus for the automatic transmission as claimed in claim 11, wherein a gear shift ratio of the continuously variable transmission mechanism is controlled at an unlimited stage in accordance with a hydraulic pressure controllably supplied to at least a drive pulley of the continuously variable transmission and the gear shift ratio of the engagement sections of the stepwise variable transmission mechanism is selectively controlled in accordance with the hydraulic pressure controllably supplied to a low brake, a high clutch, and a reverse brake to select one of a forward first speed, a forward second speed, and a reverse.

13. A control apparatus for an automatic transmission, comprising: stepwise variable transmission mechanism means including a plurality of engagement sections, each of the engagement sections being engaged according to an increase in a capacity of a corresponding one of the engagement sections while being released according to a reduction in the capacity of corresponding another of the engagement sections and a target gear shift stage being determined according to a combination of release and engagement of the respective engagement sections; and control means for controlling a gear shift state of the stepwise variable transmission mechanism means to become equal to a target gear shift state by releasing a first engagement section of the engagement sections according to a reduction in the capacity of the first engagement section and, simultaneously, by engaging a second engagement section of the engagement sections according to an increase in the capacity of the second engagement section, in accordance with a torque inputted to the stepwise variable transmission mechanism, the control means, during an inertia phase when the stepwise variable transmission mechanism means is gear shift controlled, making either one of the first and second engagement sections function to be a gear shift state control side engagement section and increasing the capacity of a gear shift non-control side engagement section which is the other of the first and second engagement sections when determining that it is impossible to make the gear shift state of the stepwise variable transmission mechanism means follow up the target gear shift state at the gear shift state control side engagement section.

14. A control method for an automatic transmission, the automatic transmission comprising a stepwise variable transmission mechanism including a plurality of engagement sections, each of the engagement sections being engaged according to an increase in a capacity of a corresponding one of the engagement sections while being released according to a reduction in the capacity of corresponding another of the engagement sections and a target gear shift stage being determined according to a combination of release and engagement of the respective engagement sections and the control method comprising controlling a gear shift state of the stepwise variable transmission mechanism to become equal to a target gear shift state by releasing a first engagement section of the engagement sections according to a reduction in the capacity of the first engagement section and, simultaneously, by engaging a second engagement section of the engagement sections according to an increase in the capacity of the second engagement section, in accordance with a torque inputted to the stepwise variable transmission mechanism; and, during an inertia phase when the stepwise variable transmission mechanism is gear shift controlled, making either one of the first and second engagement sections function to be a gear shift state control side engagement section and being configured to increase the capacity of a gear shift non-control side engagement section which is the other of the first and second engagement sections when determining that it is impossible to make the gear shift state of the stepwise variable transmission mechanism follow up the target gear shift state at the gear shift state control side engagement section.

* * * * *